US005893051A

United States Patent [19]
Tomohiro

[11] Patent Number: 5,893,051
[45] Date of Patent: Apr. 6, 1999

[54] METHOD OF ESTIMATING TEMPERATURE INSIDE MATERIAL TO BE COOKED AND COOKING APPARATUS FOR EFFECTING SAME

[75] Inventor: Teruhiko Tomohiro, Ikoma, Japan

[73] Assignee: Matsushita Electric Industrial Co., Ltd., Osaka, Japan

[21] Appl. No.: 809,669

[22] PCT Filed: Sep. 6, 1995

[86] PCT No.: PCT/JP95/01944

§ 371 Date: Mar. 26, 1997

§ 102(e) Date: Mar. 26, 1997

[87] PCT Pub. No.: WO96/10152

PCT Pub. Date: Apr. 4, 1996

[30] Foreign Application Priority Data

Sep. 27, 1994 [JP] Japan .................................... 6-230987
Nov. 8, 1994 [JP] Japan .................................... 6-273642

[51] Int. Cl.[6] ............................ G01K 3/00; G01K 11/00; F24C 1/00

[52] U.S. Cl. .................... 702/130; 702/528.34; 219/710; 374/142

[58] Field of Search ............................ 364/557; 219/710, 219/494, 712, 634; 99/325; 702/130, 99, 528.34, 528.4, 528.13; 374/142

[56] References Cited

U.S. PATENT DOCUMENTS 5,389,764 2/1995 Nishii et al. ............................ 219/506
5,491,323 2/1996 Mori et al. ............................. 219/710

FOREIGN PATENT DOCUMENTS 529 644 3/1993 European Pat. Off. .
4-333111 11/1992 Japan .
6-241463 8/1994 Japan .

*Primary Examiner*—Kamini Shah
*Attorney, Agent, or Firm*—Wenderoth, Lind & Ponack, L.L.P.

[57] ABSTRACT

Data of physical property values of a material to be cooked and thermal conduction operation procedures are stored, and data of the material and heating data are input, so that a heating output of a particular part of the material may be calculated based on a distance between the particular part of the material and a predetermined reference point. A temperature rise value per unit time of the particular part of the material is obtained from the input data of the material and the heating output. A thermal conduction operation is carried out in accordance with the stored operation procedures with the use of the temperature rise value.

22 Claims, 21 Drawing Sheets

$\Delta t_b < \Delta t_a$

METHOD OF ESTIMATING TEMPERATURE INSIDE MATERIAL TO BE COOKED AND COOKING APPARATUS FOR EFFECTING SAME

TECHNICAL FIELD

The present invention relates to a method of estimating the temperature or temperature changes inside a material subjected to radiation heating, convection heating, high frequency heating or the like, particularly, inside a material cooked in a microwave oven, an oven, etc. The present invention also relates to a cooking apparatus for effecting this method.

BACKGROUND ART

A conventional high frequency cooking apparatus which is a kind of the aforementioned cooking apparatus, namely, a microwave oven, has a construction as shown in FIG. 22. A main body 1 of the cooking apparatus has a door 2 at a front face thereof. A material to be cooked is brought in and out of a chamber 3 of the main body by opening and closing the door 2. A high frequency generation device 4 is installed inside the main body 1 and, an emission opening 5 is formed at a top or ceiling face of the chamber 3 to emit high frequency waves into the chamber. The emission opening 5 or a plurality of emission openings 5 are formed in some apparatuses at a rear face or a side face of the chamber other than the top face. A moisture sensor 6 detects the generation of moisture subsequent to cooking, which is utilized to find the progress of cooking. A weight sensor 7 detects the weight of the material to be cooked and is used to adjust the cooking time. These sensors are not always used together, but may be used separately or in combination with other sensors.

During cooking with the use of the thus-constructed high frequency cooking apparatus, there are ways of cooking, e.g., in one way the material is heated only for a preset time; in a different way the cooking is controlled based on values of the humidity and weight detected by the above sensors, that is, the cooking is carried out automatically; in another different way, program cooking is executed, specifically, a heating output and an emission time can be minutely programmed beforehand, so that the cooking is controlled automatically every moment as set by the program. For example, when a frozen meat is to be defrosted and cooked, the meat should be first heated quickly, then moderately, and considerably softly last so as not to be overheated. The meat is properly cooked in the program cooking once the heating intensity and the heating time in each heating state or stage are programmed beforehand. The above-described cooking ways are selected in accordance with the kind of material to be cooked or how to cook the material, resulting in sufficiently satisfactory effects under certain conditions. Optimum cooking conditions for various kinds of materials and cooking ways have been determined from experiments and offered in the form of cookbooks and the like.

Nevertheless, the way of high frequency cooking is unable to control temperatures minutely and delicately, because every material generates a different amount of heat and is greatly influenced by its shape during high frequency heating. Each material cannot be heated uniformly, either. Due to such characteristics of high frequency heating as above, a satisfactory temperature control cannot be achieved when the progress of cooking is indirectly detected by way of the above-described sensing, not by directly detecting the temperature of the material. Meanwhile, if the temperature of the material is to be directly detected, a sensor which does not include metallic parts generating heat by themselves when influenced by high frequency waves or a sensor designed to be resistant to influences by electric waves is needed, although there has been hardly any sensor meeting this requirement put in practical use. In other words, a delicate temperature control based on a temperature change of the material detected during high frequency heating/cooking has never been carried out heretofore. Nor has a control to improve the nonuniform heating state been realized because of the reason that the temperature of the material cannot be detected during cooking. As such, cooking requiring a sensitive temperature control, e.g., vacuum cooking at low temperatures or the like with the use of a high frequency cooking apparatus has not been practiced yet.

In the above-described conventional construction, cooking was done for a fixed time under preliminarily set conditions for menus for which the optimum cooking conditions were already known. Such cooking conditions were conditions conforming to individual cooking apparatuses with no relation to the temperature change of materials. Although it is well known that meat should be heated as rapidly as possible not to exceed 70° C. and vegetables should be heated to 90° C. or higher temperatures, how to set conditions for this way of heating differed in each of the conventional apparatuses. Therefore, the cooking conditions were determined without the temperature change of materials taken into consideration, but with an aim for controlling the operation of each cooking apparatus. In the prior art, unless the optimum cooking condition for each individual cooking apparatus is known, it is hard to perform cooking as required.

The above holds true also for automatic cooking with a programming function. An optimum condition specific to each cooking apparatus and in conformity with each menu should be preliminarily obtained so as to set an optimum program for the menu.

In the case of sensor cooking using various kinds of sensors, the detected physical amount and the temperature of the material are not associated with each other, with the result that the cooking apparatus is controlled based on the ambient temperature or humidity during cooking. While the temperature of the material is directly detected in considerably rare cases, it is practically difficult to detect the temperature of a part of the material for which the temperature is really wanted. Therefore, the cooking apparatus is not controlled using the temperature or temperature change of the material as a parameter.

As discussed hereinabove, the temperature change of the material could not be predicted prior to cooking, or the temperature of the material could not be detected on real-time basis in the middle of cooking in the conventional heating/cooking technology. A good cooking result was hence hard to obtain unless the optimum cooking condition was known. A delicate temperature control in accordance with the temperature of the material was also difficult to achieve.

The present invention has been devised to solve the above-described inconveniences inherent in the prior art, and has for its object to provide a temperature estimation method whereby a temperature change of a material (substance to be cooked) in the middle of cooking is estimated in conformity with the quantity, kind and heating condition of the material. It is also an object of the present invention to provide a cooking apparatus enabling cooking of a material always under required heating conditions irrespective of the amount and kind of the material or the user's experience with the apparatus, etc., with a temperature or temperature change of the material during cooking taken into consideration.

SUMMARY OF THE INVENTION

In order to accomplish the above object, a first temperature estimation method of the present invention comprises the steps of: storing data of physical properties values of a material to be cooked and thermal conduction operation procedures; inputting data of the material and heating data; calculating a heating output to a part of the material in accordance with a distance between the part of the material and a predetermined reference point; obtaining a temperature rise value per unit time of the part of the material from the input data of the material and the calculated heating output; and carrying out a thermal conduction operation with the use of the temperature rise value in accordance with the stored thermal conduction operation procedures.

Specifically, a plurality of reference points are set on the surface of the material to be cooked and the heating output is calculated in accordance with the distance between the part of the material and each reference point. In another example, the reference point is set approximately at the center of the material to be cooked and the heating output is calculated on the basis thereof. The present invention also uses a combination of these two methods.

A second temperature estimation method of the present invention comprises the steps of: storing an operation coefficient set for every material to be cooked and operation procedures; inputting data of the material and heating data; calculating a temperature change rate in accordance with the operation procedures with use of an initial temperature obtained from the data of the material for use as a reference temperature of at least two parts of the material, a weight of the material obtained from the data of the material, a heating output obtained from the heating data, and the operation coefficient determined from the data of the material; setting an optional calculation time interval $\Delta T$; calculating a temperature after the $\Delta T$; and repeating an operation using the calculated temperature as the reference temperature.

A third temperature estimation method of the present invention comprises the steps of: storing an operation coefficient set for every material to be cooked and operation procedures; inputting data of the material and heating data; detecting a temperature on a surface of the material; calculating a temperature change rate in accordance with the operation procedures with use of an initial temperature obtained from the data of the material for use as a reference temperature of a predetermined part of the material, the temperature detected on the surface of the material, a weight of the material obtained from the data of the material, a heating output obtained from the heating data, and the operation coefficient determined from the data of the material; setting an optional calculation time interval $\Delta T$; calculating a temperature after the $\Delta T$; and repeating an operation using the calculated temperature as the reference temperature.

A cooking apparatus of the present invention using the above temperature estimation method has the following construction.

A first cooking apparatus of the present invention includes elements characterized as follows. A heating means is operable for heating a material to be cooked. A control means is operable for controlling the heating means. A temperature change estimation means is operable for estimating a temperature change of the material. The first cooking apparatus also includes an external input means. A plurality of set temperatures corresponding to heating times are input with use of the external input means for at least a part of the material being cooked. The temperature change of each part of the material subsequent to the control of the heating means is estimated by the temperature change estimation means, so that the control means controls the heating means to make the estimated temperature at any optional time point nearly agree with the plurality of set temperatures input through the external input means.

A second cooking apparatus of the present invention includes elements characterized as follows. A heating means is operable for heating a material to be cooked. A control means is operable for controlling the heating means. A temperature estimation means is operable for estimating a temperature of the material. The second cooking apparatus also includes an external input means and a temperature detection means. A plurality of set temperatures corresponding to heating times are input with use of the external input means for at least a part of the material being cooked. A temperature of a part of the material which is undetectable by the temperature detection means is estimated by the temperature estimation means based on a temperature detected by the temperature detection means, while the control means controls the heating means to make the temperature of the material nearly agree with the plurality of set temperatures input through the external input means.

More specifically, the temperature detection means detects the temperature of an atmosphere surrounding the material and the temperature estimation means estimates the temperature inside the material based on the ambient temperature detected by the temperature estimation means, so that the control means controls the heating means to make the estimated temperature inside the material nearly agree with the plurality of set temperatures input through the external input means.

Alternatively, the temperature detection means detects a surface temperature of the material in a non-contact manner, and the temperature estimation means estimates the temperature inside the material based on the surface temperature detected by the temperature detection means, so that the control means controls the heating means to make the estimated temperature inside the material nearly agree with the plurality of set temperatures input through the external input means.

An infrared temperature sensor may be utilized as the non-contact temperature detection means.

If a contact-type temperature detection means is employed, the temperature detection means is brought into contact with the material to detect the surface temperature of the material.

A third cooking apparatus includes elements characterized as follows. A heating means is operable for heating a material to be cooked. A control means is operable for controlling the heating means. A temperature estimation means is operable for estimating a temperature of the material. A temperature detection means includes a detecting part fitted at a surface of the material and a receiving part for receiving data from the detecting part in a non-contact manner. A processing part is operable for converting received data to temperatures. The third cooking apparatus also includes an external input means. A plurality of set temperatures corresponding to heating times are input with use of the external input means for at least a part of the material being cooked, while the temperature detection means detects a temperature of the surface of the material or a part inside the material, and the temperature estimation means estimates a temperature inside the material based on the temperature detected by the temperature detection means, so that the control means controls the heating means to make the estimated temperature inside the material nearly agree with the plurality of set temperatures input through the external input means.

In the above-described constitution, a temperature-sensitive liquid crystal device may be used as the detecting part of the temperature detection means, and a camera device may be used as the receiving part.

Also, a display means may be additionally used to display at least one of the temperature detected by the temperature detection means, the temperature estimated by the temperature estimation means, and the set temperatures input by the external input means.

A high frequency heating means may be employed as the heating means.

A fourth cooking apparatus of the present invention includes elements characterized as follows. A high frequency heating means is operable for heating a material to be cooked. A control means is operable for controlling the high frequency heating means. A temperature estimation means is operable for estimating a temperature of the material. A needle-shaped temperature detection means is operable for detecting a temperature inside the material by insertion of the temperature detection means into the material. The fourth cooking apparatus also includes an external input means. A plurality of set temperatures corresponding to heating times are input with use of the external input means for at least a part of the material being cooked. The temperature estimation means estimates a temperature of the part of the material based on the temperature inside the material detected by the temperature detection means, so that the control means controls the heating means to make the estimated temperature of the part of the material nearly agree with the plurality of set temperatures input through the external input means.

The temperature estimation method for estimating the temperature inside the material and the cooking apparatus according to the present invention operate as follows.

In the first temperature estimation method, when the plurality of reference points are set on the surface of the material and the heating output is calculated in accordance with the distance from each of the reference points, the temperature rise value is determined in accordance with the distance from the surface of the material. Accordingly, such a heating distribution is expressed by the temperature rise value that the heat, while being attenuated, is transmitted primarily from the surface of the material to the interior of the material to thereby make the surface high in temperature and interior low in temperature. How the heat is transmitted inside the material is analyzed by a thermal conduction operation means based on the temperature rise per unit time, whereby the temperature inside the material is estimated.

Also, in the first temperature estimation method, when the reference point is set approximately at the center of the material, since the temperature rise value is determined with the distance between a part of the material to be detected and the center of the material taken into consideration so that the part of the material farther from the center is raised higher in temperature, the temperature rise value represents the heating distribution inside the material resulting from the shape of the material. The temperature inside the material is estimated, based on the temperature rise per unit time, by analyzing how the heat is transmitted inside the material using a thermal conduction operation means.

According to the second temperature estimation method, the temperature change rate of two predetermined parts of the material is calculated with the use of the operation coefficient and operation procedures based on the data of the material, the initial temperature (input as the heating data and used as the reference temperature of the material), the weight of the material and the heating output. Thereafter, the obtained temperature change rate is multiplied by the optional calculation time interval ΔT, to thereby obtain the temperature rise value for the time interval ΔT. Then, the temperature change rate is obtained again with the use of the detected temperature as the next reference temperature. By repeating this process, the temperature, changing every moment from the start of heating, is estimated for the two predetermined parts of the material.

According to the third temperature estimation method, the temperature change rate of the preliminarily designated part of the material is calculated with the use of the operation coefficient and in accordance with the operation procedures based on the data of the material, the initial temperature (input as the heating data and used as the reference temperature of the material), the weight, the heating output and the surface temperature detected by the temperature detection means. The temperature change rate is multiplied by the optional calculation time interval ΔT, so that the temperature rise value for the time interval ΔT is obtained. Moreover, the temperature change rate is calculated again with the use of the above-obtained temperature and the surface temperature detected after ΔT respectively as the reference temperature and the present temperature. The temperature of the designated part is estimated by repeating this process.

Since the temperature change estimation means is installed in the first cooking apparatus of the present invention, the temperature change of the material is estimated prior to cooking based on the data related to the material which is input by the external input means and the preliminarily set data related to heating. Accordingly, the cooking apparatus makes it possible to control the temperature change so that it almost agrees with at least the set temperature of one part of the material being cooked which is input by the external input means.

Moreover, since the second or third cooking apparatus of the present invention is equipped with the temperature detection means and the temperature estimation means, the temperature inside the material is estimated based on the temperature data (for example, surface temperature of the material) obtained by the temperature detection means during cooking. Accordingly, the cooking apparatus makes it possible to control the temperature of the material so that it almost agrees with at least the set temperature of one part of the material which is input by the external input means.

BEST MODE FOR CARRYING OUT THE INVENTION

Preferred embodiments of the present invention will be described hereinbelow with reference to the drawings.

Figure 1:
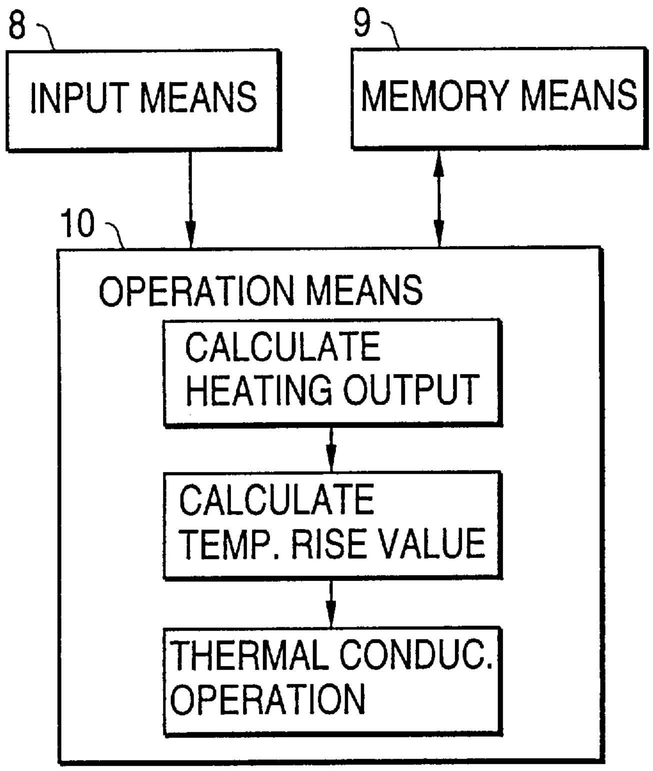
FIG. 1 is a block diagram showing a system for carrying out a first temperature estimation method of the present invention.

FIG. 1 is a block diagram of hardware for carrying out a temperature estimation method according to a first aspect of the present invention. An input means 8 such as a keyboard, push button, touch panel or the like is used to input data of materials to be cooked and heating data so that the data is received by the hardware. A memory means 9, specifically, a magnetic recording device, an optical disk or the like stores data of physical properties, operation procedures, etc. of a plurality of materials to be cooked. This data is necessary for calculation operations. An operation means 10 actually processes so as to estimate the temperature of a material to be cooked based on input data and the data stored in the memory means 9. The operation means 10 has at least three functions, i.e., a function of calculating a heating output corresponding to a reference point set with respect to the material, a function of calculating a temperature rise value with the use of the calculated heating output, and a function of operating a thermal conduction with the use of the calculated temperature rise value. An operation action by the operation means will be discussed in detail later. Although not shown in the figure, an operation result by the operation means is output to various kinds of displays or a printer or, via signal lines if an estimated temperature is to be used to control a cooking apparatus.

Figure 2:
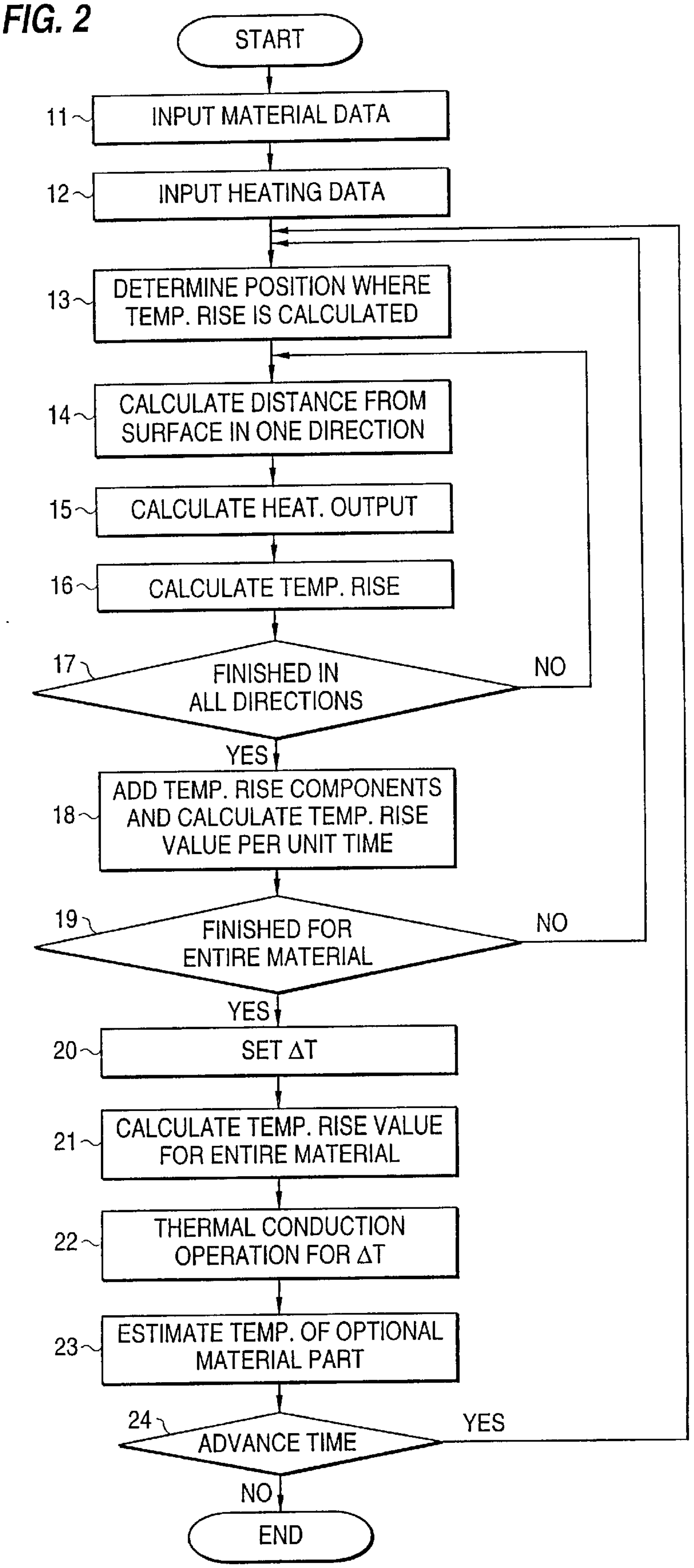
FIG. 2 is a flow chart of an operation when reference points are set on the surface of a material to be cooked in the first temperature estimation method.

FIG. 2 is a flow chart of procedures performed by a calculation means for calculating the heating output in accordance with the distance of each reference point from the surface of the material when a plurality of reference points are set on the surface of the material, according to the temperature estimation method in the first aspect of the invention.

First, data of the material to be cooked is input through the input means 8 (step 11). Specifically, the data includes the name, weight, shape, temperature, etc., of the material, which is input by selecting among preliminarily set menus or is directly input through the keyboard, or in like manner. Heating data is then input (step 12). The heating data indicates a heating output and an emission time. If the heating output changes every moment, conditions of the change are included in the heating data. The heating data is input through the input means 8, in a manner similar to the input of the data of the cooking material. When the input means is used in combination with a cooking apparatus, the heating data can be input automatically by way of a control parameter of the cooking apparatus.

Figure 3:
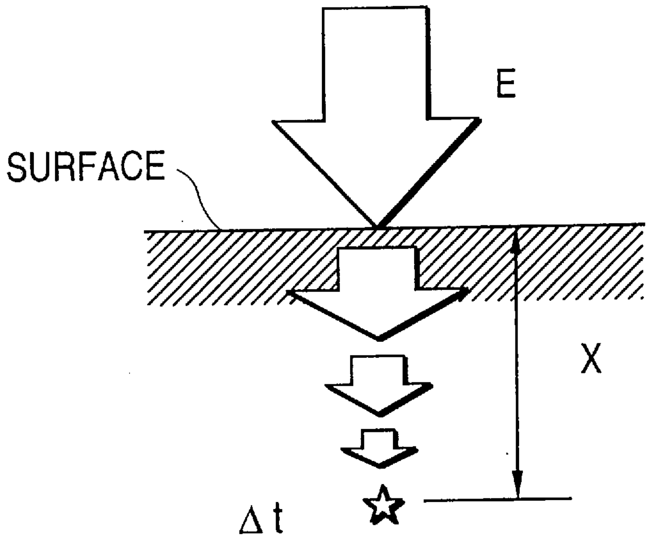
FIG. 3 is a diagram illustrating the attenuation of a high frequency wave due to penetration of the wave into a material.
Figure 4:
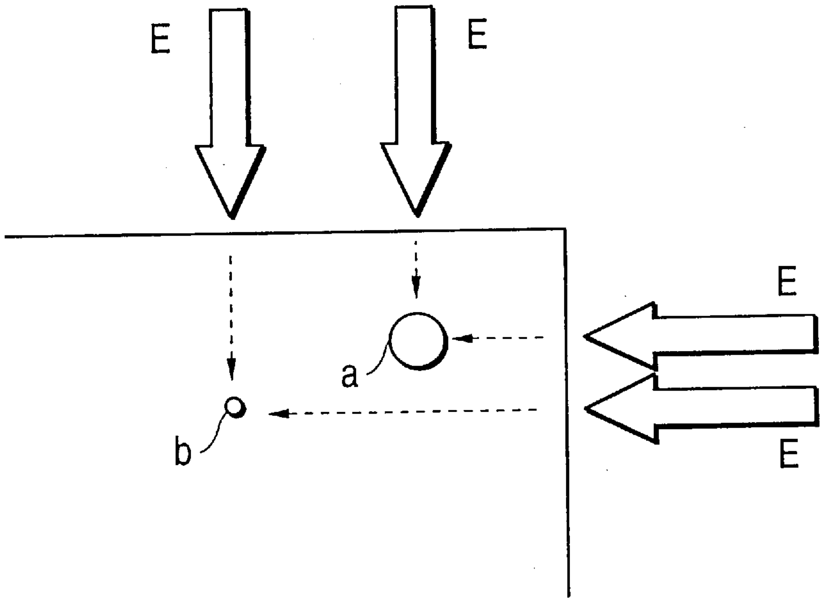
FIG. 4 is a diagram explanatory of the penetration of high frequency waves.

The temperature is actually estimated in accordance with the following procedures. The whole of the cooking material is first divided into some parts and attention is given to one of the parts (step 13). At this time, the cooking material should be divided relatively minutely so that the divided parts are utilized for the analysis of thermal conduction. According to the present estimation method, reference points are set on the surface of the material, and a distance to the surface from the target part of the material in one of 6, (i.e., front and rear, right and left and up and down), directions is calculated (step 14). A temperature rise component $\Delta t$ of the part is determined in accordance with the calculated distance. FIG. 3 diagrammatically shows a high frequency wave E attenuating correspondingly to a distance from the surface of the material. On the other hand, FIG. 4 illustrates the fact that a part closer to a corner of the material is heated more when high frequency waves penetrate from a plurality of directions.

In FIG. 3, an optimum correlation between the part of the material separated a distance x from the surface and the temperature rise component $\Delta t$ varies depending on factors such as the kind and shape of the material, characteristics of the particular cooking apparatus, etc. By way of example, a heating output Ei acting on the target part is calculated according to an equation below in the present estimation method (step 15):

$$Ei=E^{*}\exp[-\alpha x]$$

wherein E is a constant proportional to the heating output, indicating the volume of the heating output and therefore E becomes 0 when the heating output is 0, while $\alpha$ is a positive value of an attenuation rate of high frequency waves inside the material which can be set based on a half-life depth of high frequency waves obtained for every material to be cooked. The above equation illustrates that the high frequency waves become less intense as they penetrate into the material, namely, the waves become less effective in heating. A high frequency cooking apparatus actually exhibits a heating phenomenon as expressed by this equation. The temperature rise component Δt is represented with the use of the heating output Ei as follows (step 16):

$$\Delta t = Kf{*}Ei = Kf{*}E{*}\exp[-\alpha x]$$

wherein Kf is a physical property value specific to the material, which is obtained from the data of the material.

After temperature rise components Δt1–Δt6 in 6 directions are obtained in the above-described manner (step 17), these components are added (step 18), whereby a temperature rise value of the target part per unit time by high frequency waves is determined. The above process is repeatedly carried out for all the divided parts of the material, whereby a distribution of temperature rise values of the entire material per unit time by high frequency waves is obtained (step 19).

Subsequently, a calculation time interval ΔT is set (step 20). While the calculation time interval ΔT can be set optionally in a smaller range than the emission time period of high frequency waves obtained from the heating condition, the interval should be set minutely so as to accurately execute the thermal conduction operation. A specific value of the time interval is different depending on the material to be cooked and heating conditions. One second or shorter is generally preferred. Since the temperature rise value distribution per unit time of the total material is detected in the foregoing process, a temperature rise value for the time interval is obtained by multiplying the temperature rise value per unit time by ΔT (step 21).

Further, the temperature rise value for the time interval and the present temperature are added. A temperature distribution of the whole material is obtained in this manner. The movement of heat for the time interval ΔT is analyzed according to thermal conduction operation procedures by using the above temperature distribution as an initial condition (step 22). Various kinds of calculation methods are proposed for the thermal conduction operation, and the present invention is not limited to any of the calculation methods. The temperature of the optional target part ΔT later can thus be estimated in the above manner (step 23).

Thereafter, if the temperature at a later time is to be estimated, the above sequence of procedures is repeated N times, so that the temperature N*ΔT later can be estimated (step 24). If the heating condition in the heating data includes a time while high frequency waves are not emitted, only the thermal conduction operation in the above procedures is performed for the subject time. In general, the thermal conduction is considered to proceed from the exterior of the material heated at high temperatures to the interior of the material of low temperatures in a state where high frequency waves are not emitted.

According to the present invention, since the temperature rise of the material by high frequency waves is detected every moment, cooking can be controlled by using the temperature of the material as a parameter. In other words, cooking is controlled more accurately by using temperature than by using the simple means of time, steam, etc. For instance, when the interior of the material is to be set at 50° C., the present estimation method makes it possible to detect how much output is required for this purpose and how long the output should be generated, or what temperature other parts show than the center of the cooking material heated at 50° C. Cooking becomes accordingly controllable in conformity with a temperature state inside the material. Moreover, if a temperature difference between the surface of the material and the central part of the material is to be restricted to be not larger than a certain value, according to the present invention, the heating output is decreased or intermittent driving is controlled, or the like, to thereby raise the central temperature without increasing the surface temperature.

Figure 5:
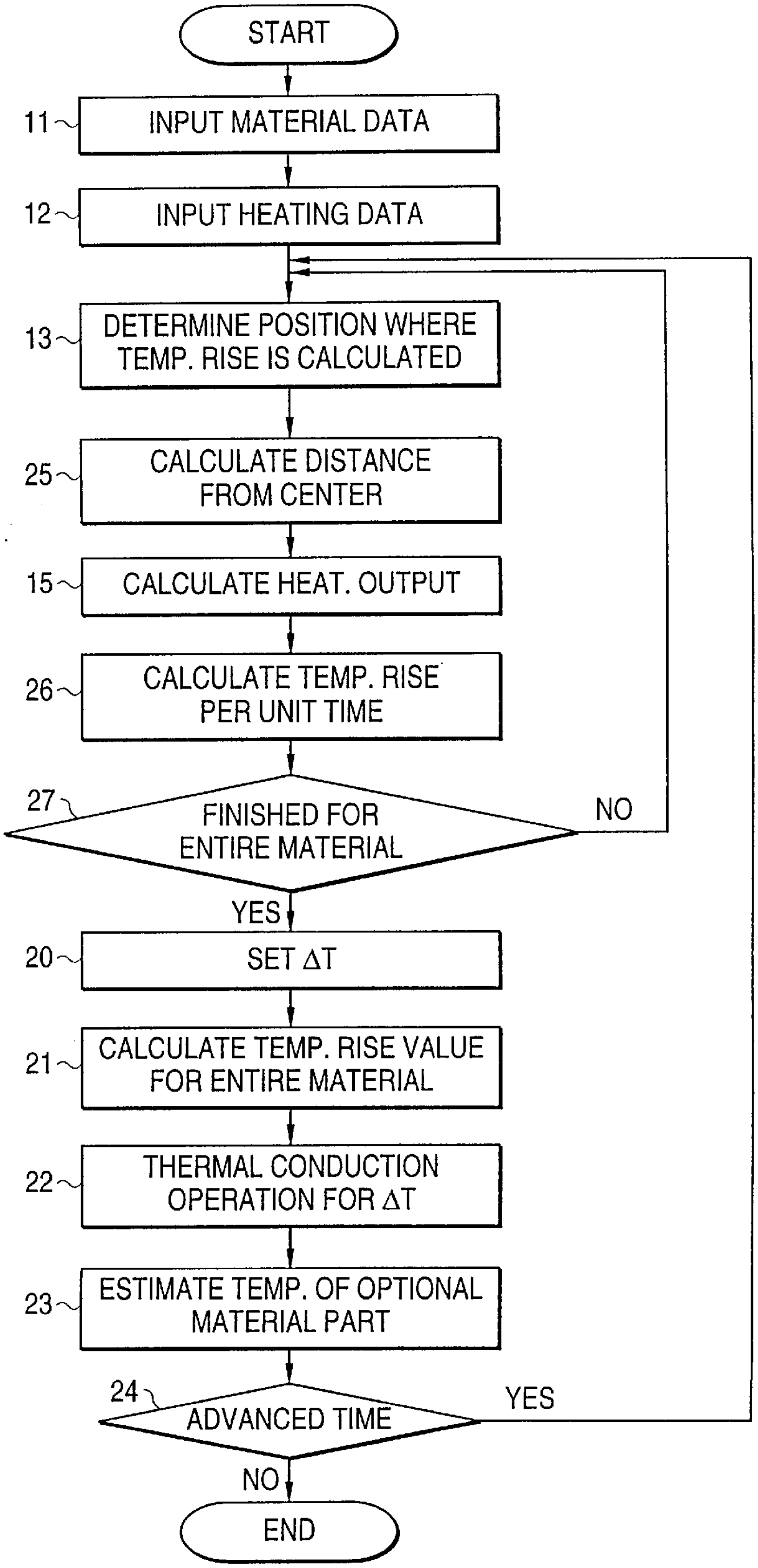
FIG. 5 is a flow chart of an operation when a reference point is set approximately at the center of the material in the first temperature estimation method.

FIG. 5 is a flow chart of procedures in the first temperature estimation method when a reference point is set approximately at the center of the material to calculate the heating output. Similar to the foregoing example, first, data of the cooking material is input through the input means 8 (step 11) and heating data is input (step 12). Contents of the input data and inputting manner are the same as in the preceding example.

The temperature is actually estimated in accordance with the following procedures. The whole material to be cooked is divided into some parts, and attention is given to one of the parts, i.e., a noted part (step 13). Since the divided parts are utilized for the analysis of thermal conduction, the material is required to be divided minutely to a certain degree. A distance between the noted part and the center of the material is detected (step 25), based on which the heating output Ei acting on the noted part is calculated (step 15). Moreover, the temperature rise value Δt per unit time is calculated (step 26). An optimum relation between the distance l from the center of the material and the temperature rise value Δt is different depending on factors such as the kind and shape of the material and characteristics of a cooking apparatus, etc. However, the following expression will be given by way of example to obtain the temperature rise value Δt per unit time:

$$\Delta t = Kf{*}Ei = Kf{*}E{*}(a{*}l + b)$$

wherein E is a constant proportional to the heating output, similar to the former example and, a and b are constants set for every material to be cooked. In the above expression, the parenthesized content is a linear expression related to the distance l from the center. Although the optimum expression differs for every material and every apparatus, the further a part is from the center of the material the higher it becomes in temperature. That is, the expression represents the actual heating phenomenon that the surface of the material is at a higher temperature than the interior and a corner part of the surface of the material is higher in temperature than a central part of the surface of the material. The temperature rise value per unit time of the noted part caused by high frequency waves is obtained according to the above expression. The sequence of procedures is conducted for all the divided parts of the material, whereby the temperature rise value distribution of the whole material per unit time by high frequency waves is obtained (step 27).

Then, the calculation time interval ΔT is set (step 20). The calculation time interval ΔT may be set at an optional value in a smaller range than the emission time of high frequency waves obtained from the heating condition. However, the time interval should be set minutely so as to accurately carry out the thermal conduction operation. While a specific value of the calculation time interval is different for each material to be cooked and depending on the heating condition, not longer than one second is generally preferred. Since the temperature rise value distribution per unit time of the whole material is obtained as above, the temperature rise value for the time interval can be calculated by multiplying the temperature rise value per unit time by ΔT (step 21).

The temperature distribution of the whole material is obtained by adding the calculated temperature rise value and the present temperature, which is used as an initial condition for analyzing the movement of heat for ΔT in accordance with the thermal conduction operation procedures (step 22). As mentioned earlier, although many calculation methods are proposed for the thermal conduction operation, the present invention is not restricted to any specific calculation method. The temperature of the optional part of the material at a time ΔT later is thus estimated in the estimation method of the invention (step 23).

If the temperature afterwards is to be estimated, the above sequence is repeated N times, so that the temperature N*ΔT can later be estimated (step 24). If the heating condition of the heating data includes a time when high frequency waves are not emitted, only the thermal conduction operation in the above procedures is enough to carry out for the time. The heat is generally considered to be transmitted from a part of the material heated at high temperatures to apart of the material at lower temperatures in a state without the emission of high frequency waves.

In the same manner as in the former example, cooking is controlled with the use of the temperature of the material as a parameter, since the temperature rise of the material caused by high frequency waves is detected every moment. The cooking temperature is controllable more accurately than by time or steam, etc. For example, when a part in the vicinity of the center of the material is required to be heated to 50° C., it can be detected how much output is required and how long the output should be radiated to reach 50° C., what temperature is shown by parts other than the central part at the time, etc. Therefore, cooking is controllable in conformity with a temperature state inside the material. If a temperature difference between a high temperature part and a low temperature part of the material is to be suppressed so as not to be not smaller than a certain value, the invention makes it possible to decrease the heating output or control intermittent driving, thereby to raise the temperature of the low temperature part without increasing the temperature of the high temperature part so much.

Figure 6:
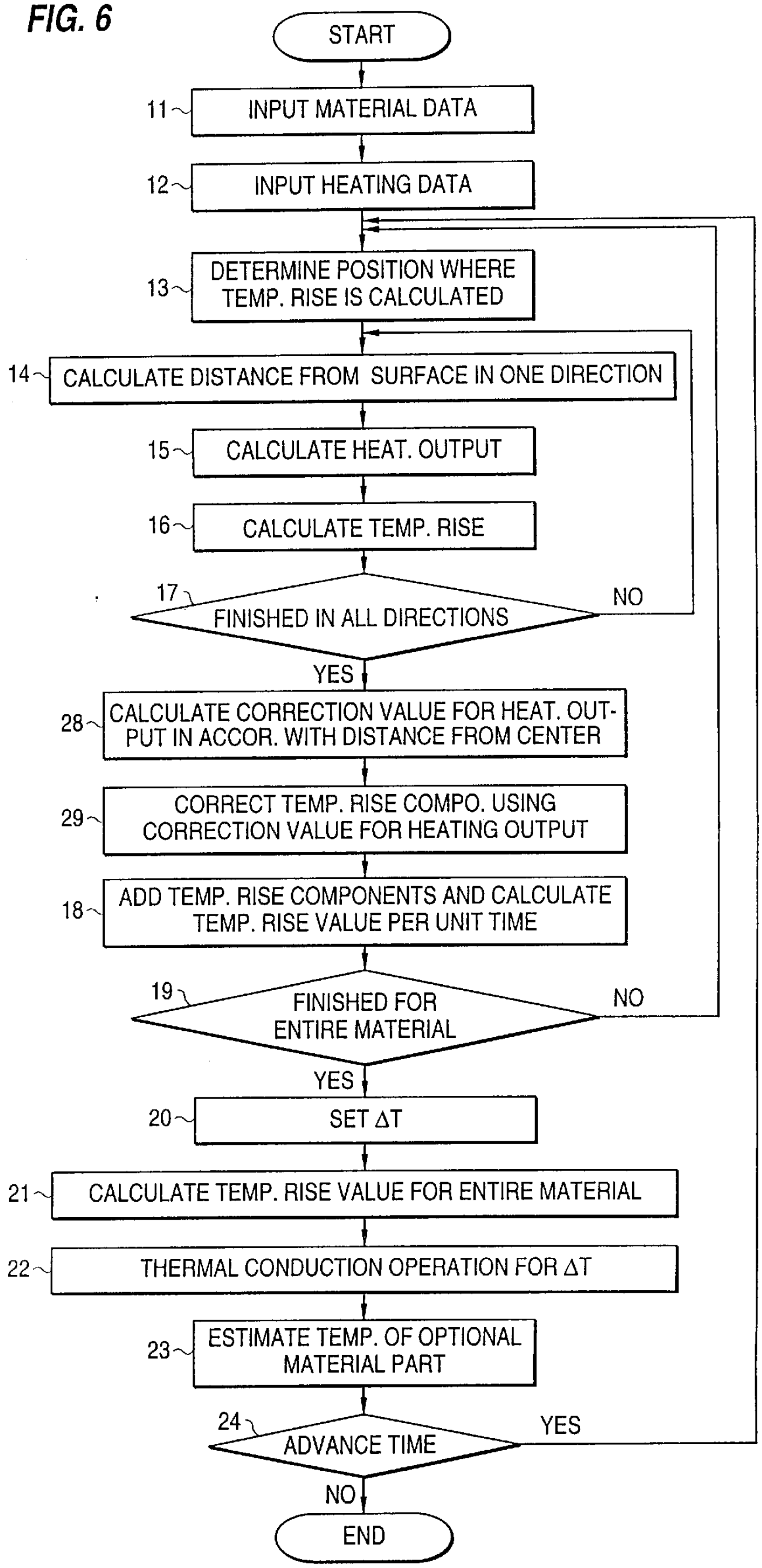
FIG. 6 is a flow chart of an operation when reference points are set both on the surface and at the center of the material in the first temperature estimation method.

FIG. 6 is a flow chart of the first temperature estimation method when reference points are set at the surface and the center of the material to be cooked. More specifically, after temperature rise components Δt1–Δt6 in all directions are obtained (step 17) in the flow chart of FIG. 2, a correction value for the heating output is calculated in accordance with the distance from the center (step 28), and the temperature rise component is corrected with the calculated correction value (step 29). Steps 18–24 shown in FIG. 2 are then carried out. Since both the phenomenon that high frequency waves attenuate as they penetrate from the surface of the material and the phenomenon that an end part separated farther away from the center of the material is easier to heat are taken into consideration when the temperature rise value by high frequency waves is calculated, the temperature can be estimated more accurately for many more kinds of materials to be cooked.

Figure 7:
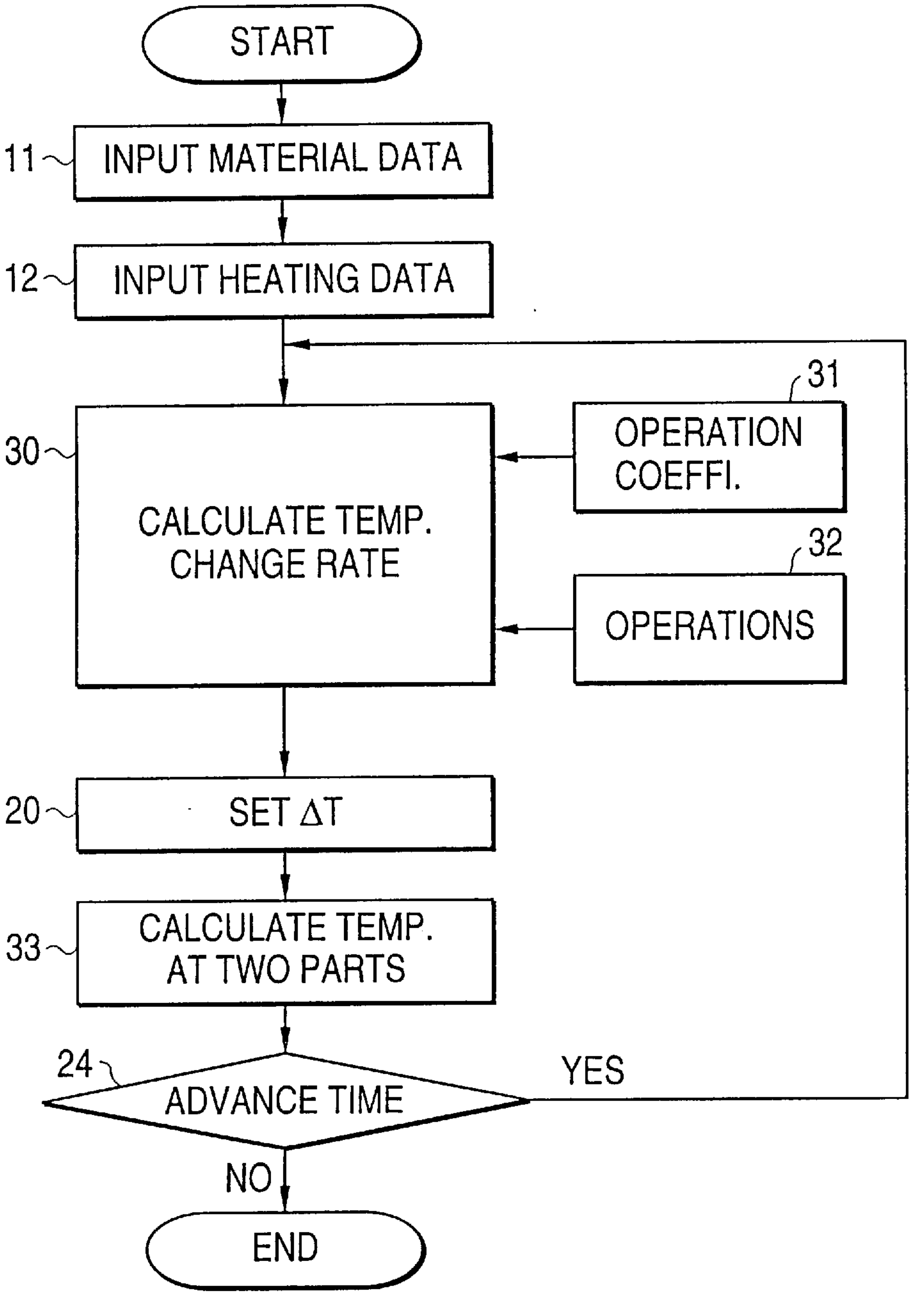
FIG. 7 is a flow chart of an operation according to a second temperature estimation method of the present invention.

FIG. 7 is a flow chart of procedures according to a temperature estimation method in a second aspect of the present invention. Temperatures at two predetermined points inside a material to be cooked are estimated in this temperature estimation method. The temperature estimation method uses an operation coefficient 31 set beforehand for every material so as to calculate a temperature change rate of each of two target points from four values, i.e., estimated temperatures of the two points, a weight of the material and a heating output. The temperature change rate is calculated in an operation step 32 with the use of the operation coefficient 31 which is different in form depending on procedures in the operation step 32. Concretely, the temperature change rate is operated based on a logically constructed formula or with the use of neurotechnology, etc. It is generally difficult to logically formulate the operation, and consequently the temperature change rate is operated by setting the operation coefficient 31 resulting from learning with the use of the neurotechnology. The neurotechnology is a technology to simulate a neural network of a brain to thereby formulate the relation of input values and output values. According to the neurotechnology, the operation coefficient 31 that satisfies the relation of the input and output values with as few errors as possible can be obtained when many sets of input and output values are present.

In this embodiment of the temperature estimation method, a central part of the material showing the lowest temperature and a corner part of the material showing the highest temperature are designated to be estimated, and the temperature change rate at each designated part is obtained many times by changing the weight of the material and the heating output. Once the operation coefficient 31 is set according to the neurotechnology based on the above-obtained data of many temperature change rates, unknown temperature change rates to weights and heating outputs can be easily calculated. Although the data as a basis for calculating the operation coefficient 31 may be collected from actual experiments, the data can also be collected by calculations according to the temperature estimation methods described earlier. What is to be noted here is that while the data is persuasive when obtained from actually measured experimental values, conducting experiments is troublesome and may be impossible in some cases, and in addition, the operation coefficient 31 may be difficult to obtain in the neurotechnology because of influences of errors or irregularities included in the experimental results.

On the other hand, if the data is collected through calculations, it is not only simply collected for a wide range of conditions, but it is free of irregularities. Therefore, the operation coefficient 31 is conveniently obtained so long as a model for the calculation is well designed.

Temperature estimation procedures with the use of the above operation coefficient will be depicted below. Data of a material to be cooked is first input through the input means 8 in the same manner as in the foregoing examples (step 11). Heating data is then input (step 12). Contents of input data and how to input the data are the same as in the first temperature estimation method. The temperature coefficient 31 to be used is determined when a name of the material to be cooked is detected from the input data. Further, an initial temperature and a weight of the material are detected from the data of the material and a heating output is obtained from the heating data. Temperature change rates at the corner part and central part of the material are eventually easily obtained in the operation step 32 (step 30). When a calculation time interval ΔT is determined at this time (step 20), temperatures at the two parts ΔT can later be promptly detected (step 33).

By repeating the process to obtain the temperature change rate with the above-detected temperatures at two parts (step 30), the temperature at an optional time point can be obtained (step 24).

Although the temperature estimation method of this embodiment can detect only the temperatures of two parts within the material, an estimation time is considerably reduced due to the utilization of the operation coefficient 31. While calculating the operation coefficient 31 takes more or less time, the temperature estimation is actually done in a time period ranging from several seconds to several tens of seconds by a personal computer. Therefore, the temperature estimation method fits to be adopted in cooking apparatuses. Although the temperature estimation is effected for only two points or parts of the material according to the present method, since the material in the cooking apparatus, such as an oven or the like, shows the lowest temperature at the central part and the highest temperature at the surface, the method is sufficiently useful for the controlling of temperatures. That is, the estimation method enables the apparatus to be turned ON and OFF so that the central part of the material becomes a predetermined temperature while the surface temperature is kept at a temperature which is not too high, i.e., the whole material is heated almost uniformly. An increased number of points or parts, e.g., 3 or 4 parts can be designated and estimated by using the neurotechnology if necessary.

Figure 8:
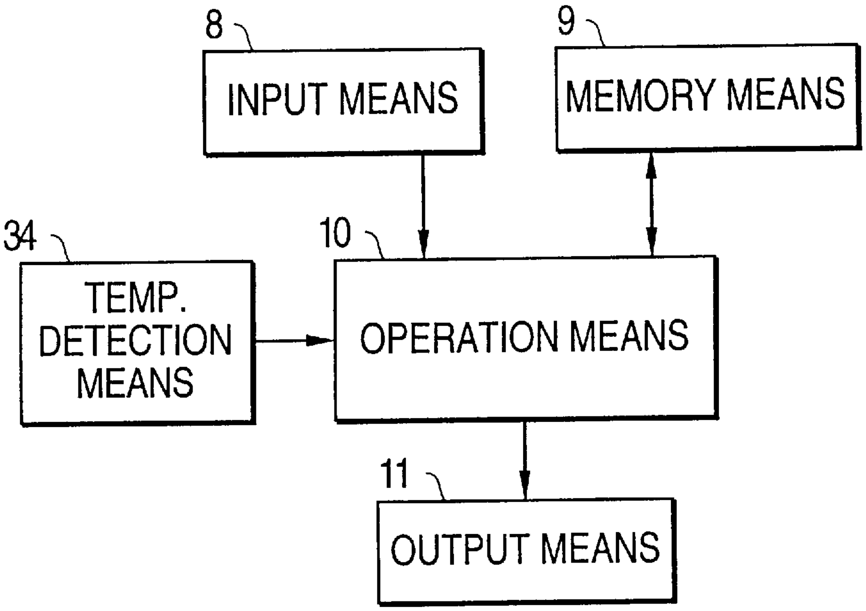
FIG. 8 is a block diagram of a system for carrying out a third temperature estimation method of the present invention.
Figure 9:
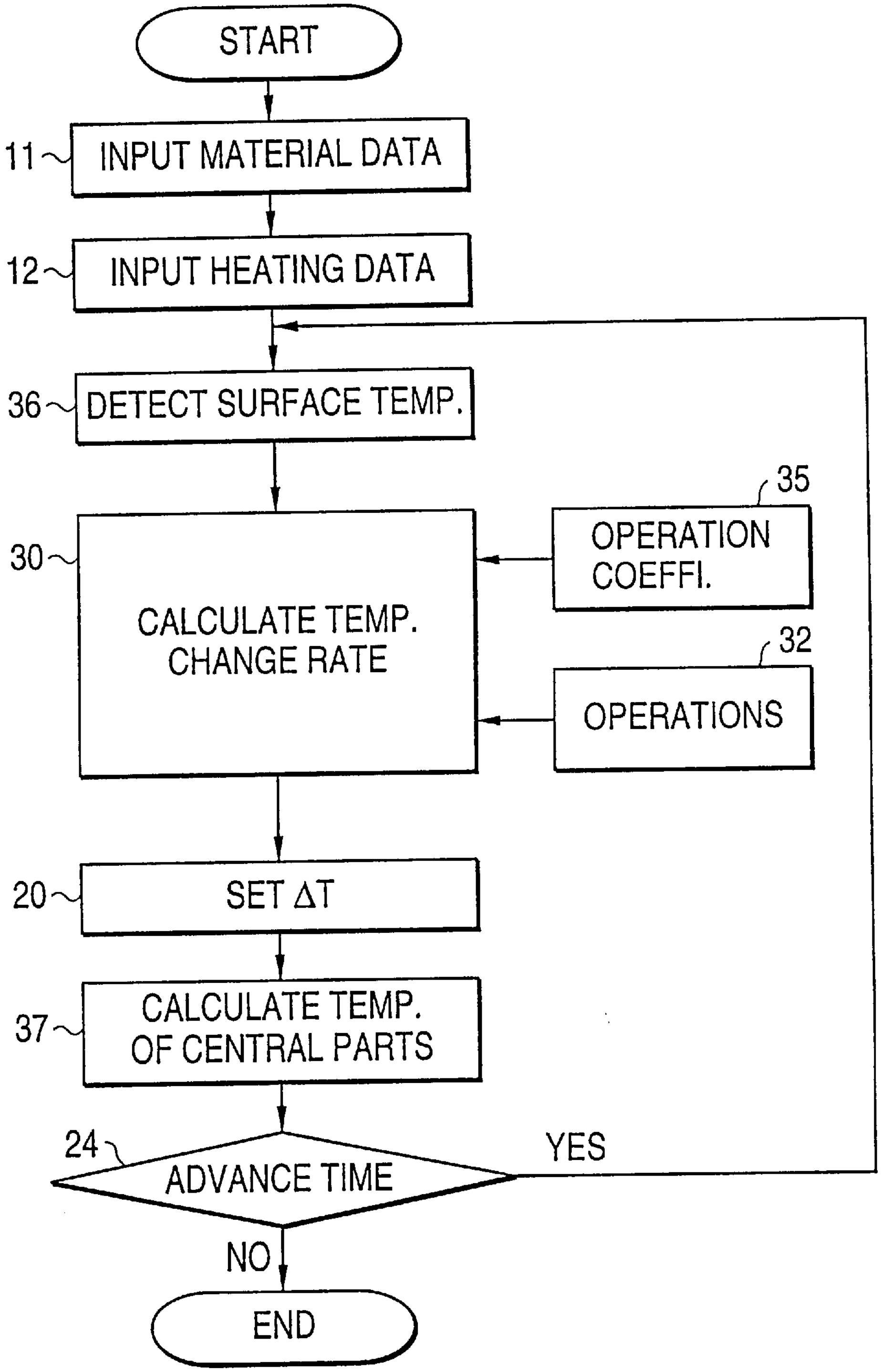
FIG. 9 is a flow chart of an operation in the third temperature estimation method of the present invention.

FIG. 8 is a block diagram of the constitution of hardware for carrying out a temperature estimation method in a third aspect of the present invention, wherein a temperature detection means 34 is added to FIG. 1. FIG. 9 is a flow chart of procedures of the third temperature estimation method. According to the present temperature estimation method, a temperature of one preset point in the material is estimated in real time while the material is actually heated. An operation coefficient 35, set for every material to be cooked, is employed. Although the operation coefficient 35 is fundamentally equal to that described in the second temperature estimation method, a temperature change rate of the one point is calculated from 4 values, namely, an estimated temperature of the one point, a temperature at one point on the surface of the material, a weight of the material and a heating output. The aforementioned temperature detection means 34 is additionally used to measure the surface temperature of the material. The operation coefficient 35 is obtained with the use of the neurotechnology in the same manner as described before.

In this embodiment, a central part of the material, which has the lowest temperature, is designated as a part to be estimated and a corner part of the material, showing the highest temperature, is set as the point on the surface of the material. The operation coefficient 35 is calculated in the same manner as in the second temperature estimation method in which the central part and the surface corner part of the material are designated as two points to be estimated. Needless to say, data for the operation coefficient 35 may be collected either experimentally or by calculations, The temperature estimation in real time simultaneously with the temperature measurement is carried out in the following manner. Like preceding examples, data of a material to be cooked is input via the input means 8 (step 11), and heating data is input (step 12). Contents of the data and inputting manner are the same as in the second method. The operation coefficient 35 to be used is determined when a name of the material to be cooked is found from the input data of the material. An initial temperature and a weight of the material are also obtained from the data of the material and a heating output is obtained from the heating data. By detecting a surface temperature at the corner part of the material by the temperature detection means 34 (step 36), a temperature change rate at the central part can be easily detected in accordance with the operation step 32 (step 30). When a calculation time interval ΔT is determined (step 20) at this time, a temperature of the central part ΔT is obtained later (step 37).

The surface temperature of the corner part is detected again at a time ΔT later after the surface temperature is first detected. Based on the surface temperature and the temperature of the central part detected earlier, the temperature change rate of the central part and further the temperature of the central part at a time ΔT later are obtained. As described herein, since the central temperature is estimated in real time via the interval of ΔT, heating is easily controlled with the use of the central temperature as a parameter. Moreover, since the surface temperature of the corner part is directly detected in the present embodiment, the central temperature can be estimated more accurately than in the example of the second estimation method estimating both the central temperature and the corner temperature. The surface temperature can be measured in a non-contact manner even under high frequency waves if an infrared sensor is used, which is far simpler than when the central temperature is measured directly.

Figure 10:
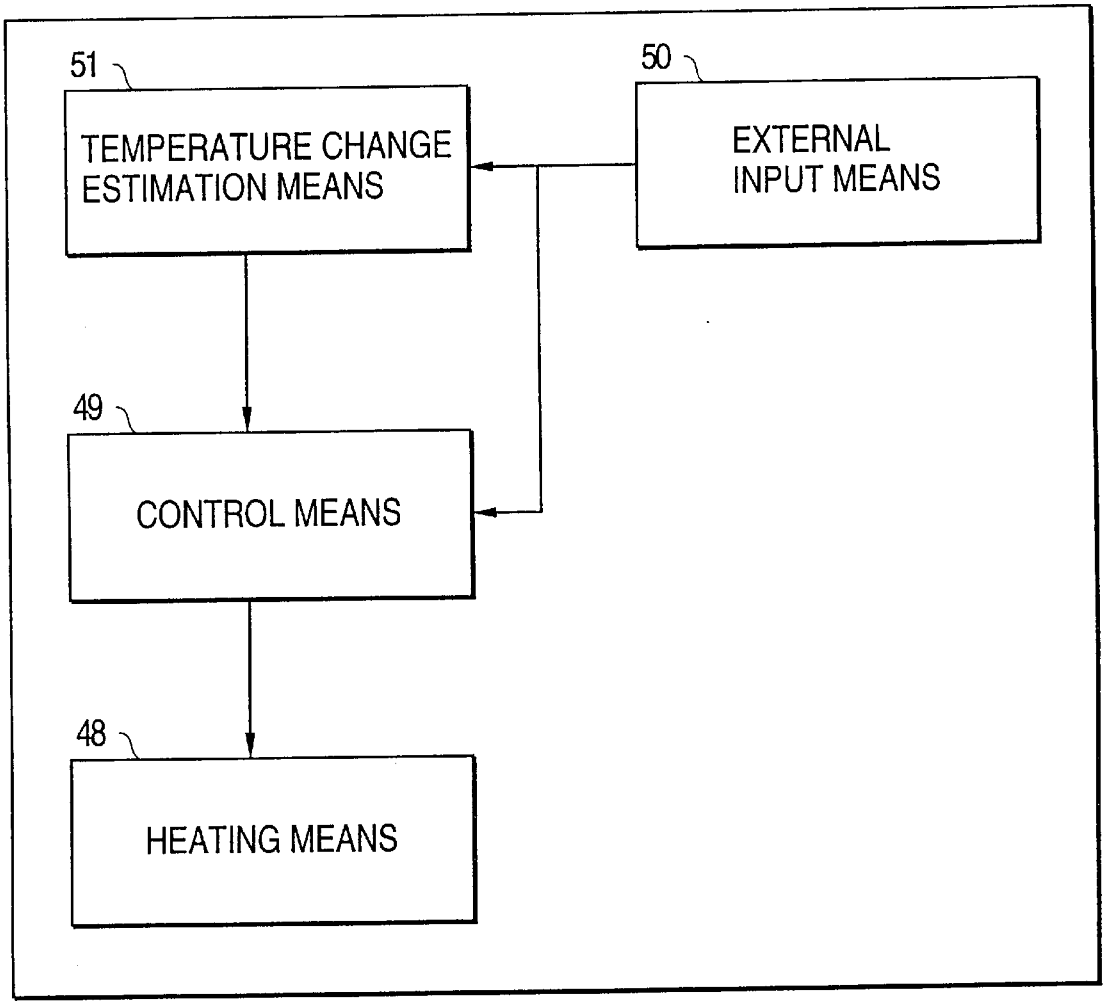
FIG. 10 is a block diagram schematically showing a first cooking apparatus of the present invention.

FIG. 10 is a block diagram of a cooking apparatus according to the present invention. Various kinds of heat sources can be utilized as a heating means 48, for instance, an electric heater, a gas burner, a magnetron, etc. A control means 49 controls the turning ON and OFF and a heating intensity of the heating means 48. An external input means 50 is used to input the kind, volume, shape, etc. of a material to be cooked and a set temperature of the material during heating. The set temperature indicates a temperature change during heating for each part of the material. In other words, the set temperature is a condition to designate whether the temperature should be raised quickly or whether the temperature should be increased gradually, etc. The set temperature can be set for one to several parts (e.g., a central part, a corner part of the material) in accordance with the content of heating. However, it is difficult to satisfy all of the set temperatures if a plurality of set temperatures are designated, and therefore one of the set temperatures should be given first priority. Since the surface temperature of the material generally rises more quickly as compared with the central temperature, overheating of the surface can be avoided if the set temperature of a part closer to the surface is considered with priority. A temperature change estimation means 51 estimates a temperature change of the material while taking data of the material input through the external input means 50 and characteristics of the heating means into account. More specifically, the estimation means 51 stores in a database temperature changes of various materials detected beforehand through experiments by heating the materials under various conditions. Alternatively, the estimation means 51 obtains the temperature change every moment through thermal analysis based on a heat property value of the material and the heating condition. The heat property value of each material should be preliminarily stored as a database in the latter case.

In cooking with the use of the above cooking apparatus, even when the kind and volume of a material to be cooked are not experienced before, cooking is automatically executed in conformity with an input heating speed and an input set temperature. For example, when 2 kg roast beef is to be prepared for the first time, so long as one knows it necessary to heat the beef quickly at first and maintain at 56° C. for one hour, even if one knows nothing about a heating intensity or a heating time, the cooking is properly controlled by designating the temperature change as the set temperature for a part of the material in the vicinity of the surface of the cooking material. In other words, the temperature change of the material during cooking is estimated before the start of cooking, so that the heating condition is satisfactorily set to make the temperature of the material nearly agree with the input set temperature, thus forming an optimum heating pattern. Therefore, even a material never tried before can be cooked without fail.

Figure 11:
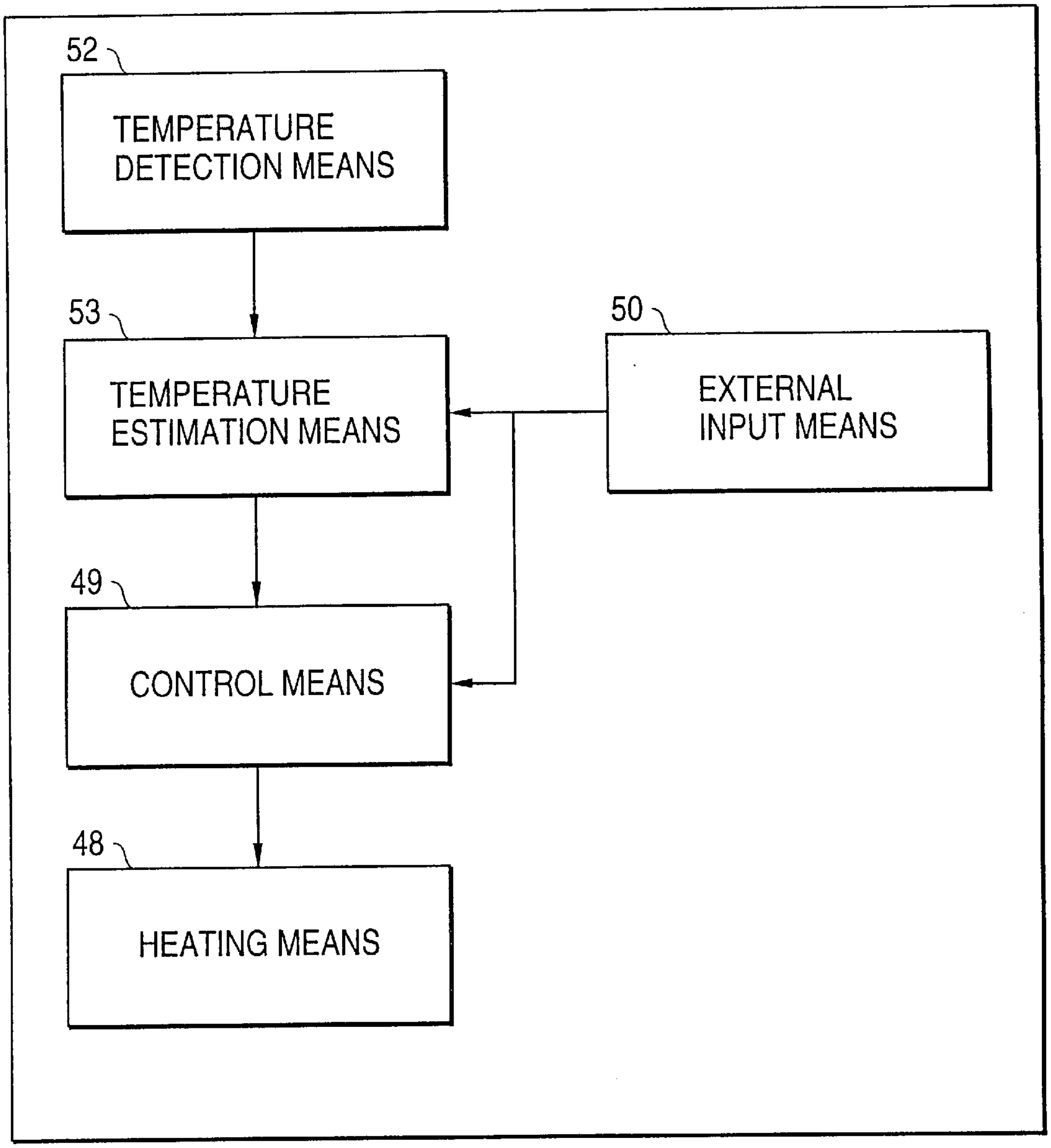
FIG. 11 is a block diagram schematically showing a second cooking apparatus of the present invention.

FIG. 11 is a block diagram of the constitution of the cooking apparatus with a temperature detection means. Parts or elements functioning the same as in FIG. 10 are denoted by the same reference numerals, and the description thereof will be omitted here. A temperature detection means 52 detects the temperature during heating. A temperature T1 to be detected is, for instance, a temperature of a heater as the heating means, an ambient temperature in the chamber, a surface temperature of the material to be cooked, an internal temperature of the material to be cooked, or the like. A temperature estimation means 53 interlocking with the temperature detection means 52 estimates a temperature T2 of a part of the material which cannot be detected directly, based on the temperature data T1 obtained by the temperature detection means 52. For example, the temperature estimation means estimates the temperature inside the material based on the temperature of the heater detected by the temperature detection means 52.

When the cooking apparatus is used to cook a material, even if the kind or volume of the material has not been experienced before, once a generally recommended temperature change or temperature is set as the set temperature at the start of cooking, the temperature T1 (e.g., temperature of the heater) is detected by the temperature detection means 52 and the temperature T2 (e.g., temperature inside the material) is estimated by the temperature estimation means 53 based on the temperature T1, and accordingly the control means 49 controls the heating means 48 so that the temperature of the material almost agrees with at least one of the input set temperatures. Even a material not experienced before can be cooked properly.

Figure 12:
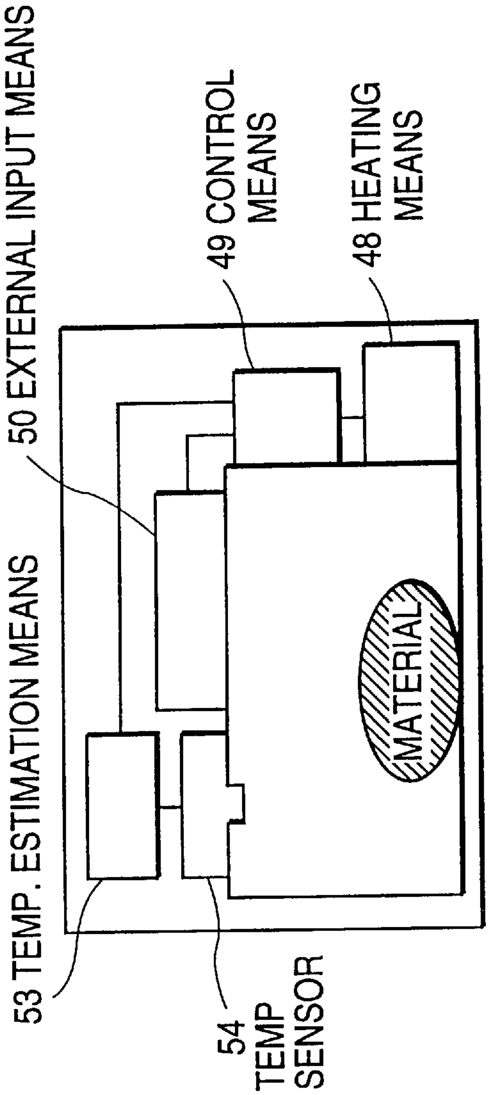
FIG. 12 is a diagram schematically showing an embodiment of the second cooking apparatus of the present invention.

FIG. 12 illustrates an example of the cooking apparatus equipped with the temperature detection means. A temperature sensor 54 detects an ambient temperature T3 inside the chamber. The temperature of the air inside the chamber heats the material through thermal transmission and thermal conduction. An internal temperature T4 of the material can be estimated by the temperature estimation means 53 based on the ambient temperature T3 obtained by the temperature sensor 54. The control means 49 controls the heating means 48 so as to change the estimated internal temperature T4 to almost agree with at least one of the set temperatures input through the external input means 50. Therefore, even a material not cooked before can be prepared without fail if a generally recommended value of the temperature change or finished temperature is known.

In the cooking apparatus, if the set temperature for the surface of the material is input through the external input means 50, the surface temperature can be estimated as well. However, cooking may be controlled by controlling the heating amount on the assumption that the temperature T3 inside the chamber is almost equal to the surface temperature of the material. In the case where the set temperatures are set respectively for a plurality of parts of the material and cannot be satisfied at the same time, the heating means 48 can be controlled so long as it is determined which of the parts is to be satisfied with priority.

Figure 13:
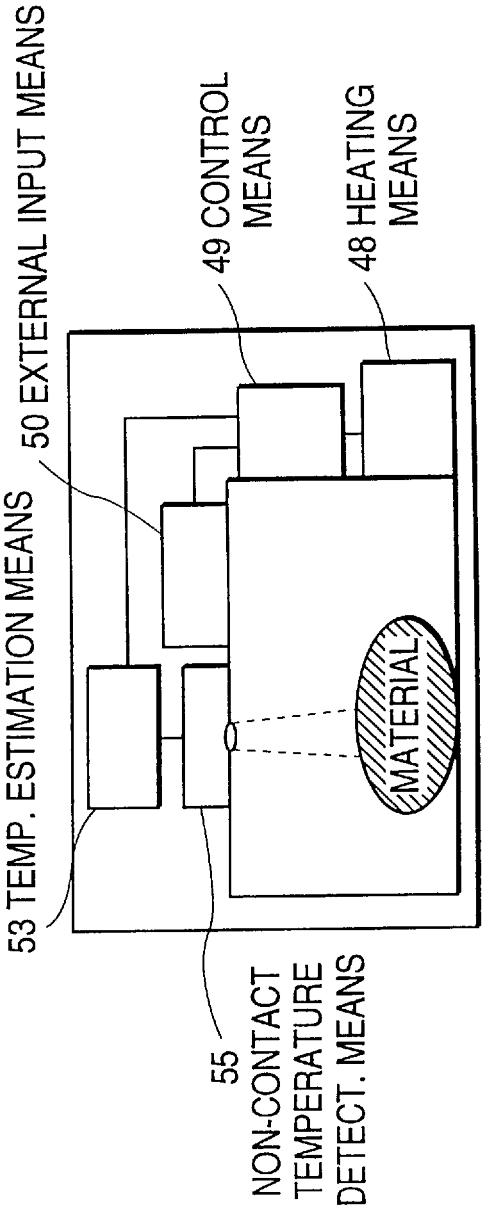
FIG. 13 is a diagram schematically showing another embodiment of the second cooking apparatus of the present invention.

FIG. 13 is a schematic diagram of the constitution of the apparatus with a modified detection means for detecting the surface temperature of the material in a non-contact manner. A non-contact-type temperature detection means 55 detects a surface temperature T5 of the cooking material, and the temperature estimation means 53 estimates the temperature T4 inside the material based on the detected surface temperature T5. Since the surface temperature of the material, not the ambient temperature in the chamber, is detected directly, the internal temperature can be accurately estimated. Moreover, since this construction allows free movement of the material, different from the case where the temperature is detected by a contact-type detection means, a turntable or the like can be employed in the apparatus. The effect of the optimum heating by controlling the heating means 48 based on the surface temperature T5 and estimated temperature T4 is the same as in the foregoing example.

Figure 14:
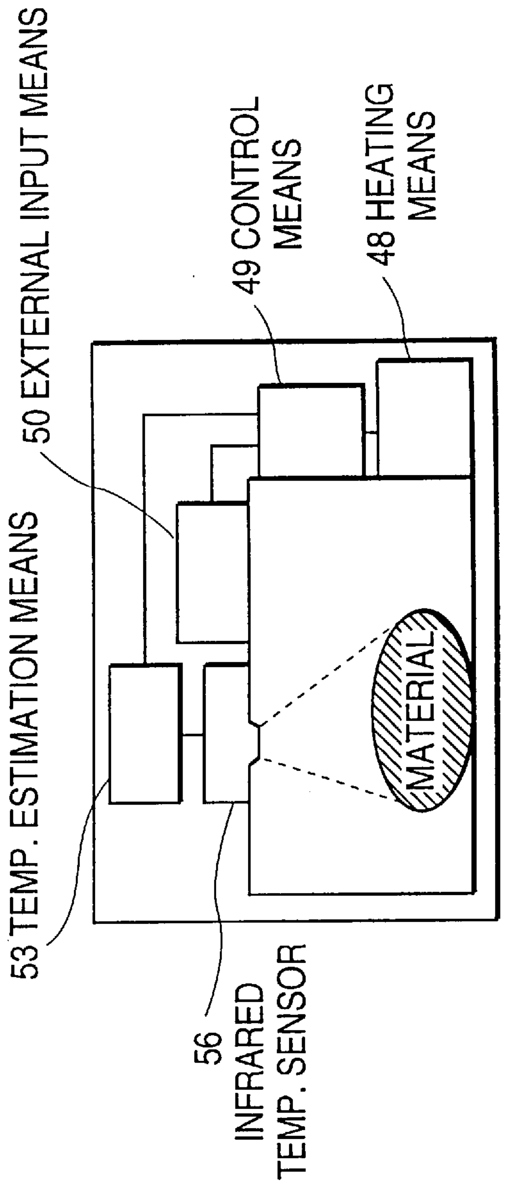
FIG. 14 is a diagram schematically showing a further embodiment of the second cooking apparatus of the present invention.

FIG. 14 is a further different example of the non-contact temperature detection means adopting an infrared temperature sensor in the cooking apparatus. An infrared temperature sensor 56, fitted at a chamber wall of the cooking apparatus, detects infrared rays from the cooking material placed within a visual field, to thereby detect the temperature without touching the material. If a position where the material is to be placed is predicted beforehand and the infrared temperature sensor 56 is set at the position, the surface temperature of the material can be detected at all times. Although the temperature of only a part of the surface of the material is detected in this method, if a plurality of sensors are used or the sensor is made movable to change a direction of the visual field, or the material is moved by the turntable, a temperature distribution of the total surface of the material can be obtained. The internal temperature is estimated on the basis of the thus-detected surface temperature of the material, so that the heating is controlled and optimized, similar to the examples described earlier.

Figure 15:
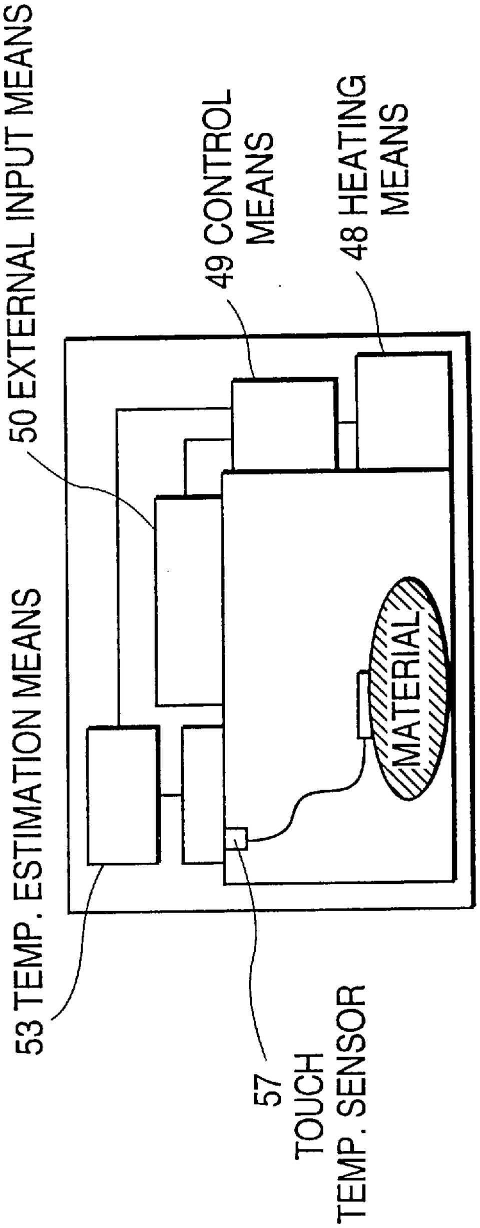
FIG. 15 is a diagram schematically showing a still further embodiment of the second cooking apparatus of the present invention.

FIG. 15 is a still different example of the constitution of the cooking apparatus with a touch temperature sensor 57 as the temperature detection means. The touch temperature sensor 57, held in touch with the cooking material, detects the surface temperature of a touched part of the material. In the case of a compact touch sensor constructed as in FIG. 15, although points or parts to be detected are limited only to one or two, a temperature distribution in a wide range can be detected if the sensor is constituted of a flatbed sensor and is arranged on a bottom of the apparatus or held between a plate and the material. The internal temperature is estimated and the heating means 48 is controlled after the surface temperature is detected, in the same manner as in the foregoing examples.

Figure 16:
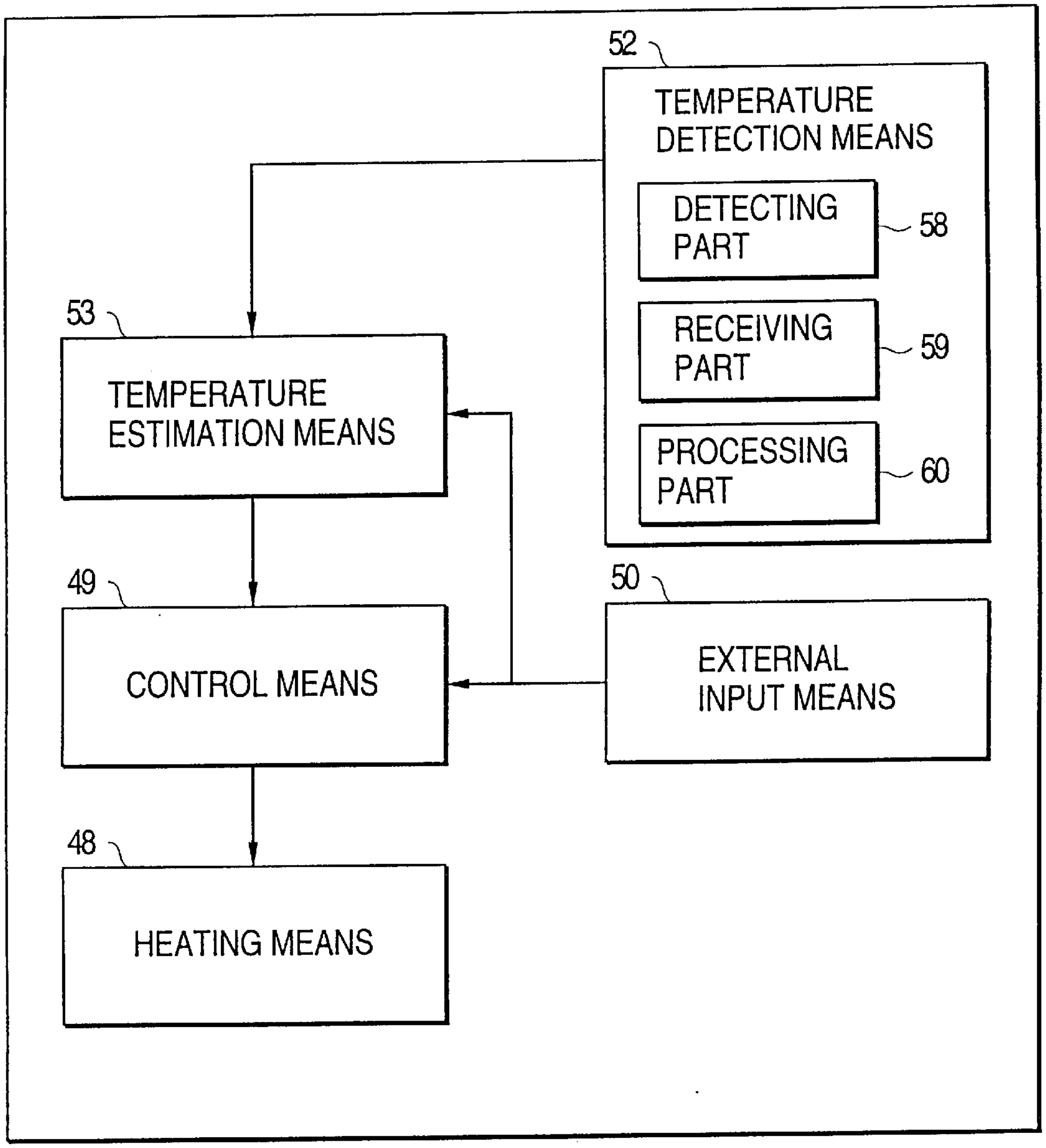
FIG. 16 is a block diagram schematically showing a third cooking apparatus of the present invention.

FIG. 16 is a block diagram of the constitution when the temperature detection means consists of a combination of a contact-type means and a non-contact-type means. A detecting part 58 of the temperature detection means 52 is attached to the material to be cooked, thereby to detect a temperature T6 of the material. The detecting part 58 is also operable for transmitting data. The "transmitting" here is not restricted to the transmission of data by electric waves, but includes the transmission of signals by any means like light, sound, etc. A receiving part 59 of the temperature detection means 52 receives signals sent from the detecting part 58. For example, when the detecting part 58 transmits electric waves, the receiving part 59 is a so-called receiver. When the detecting part 58 transmits sound signals, the receiving part 59 is a microphone. A processing part 60 of the temperature detection means 52 converts the signals received by the receiving part 59 to temperatures. A temperature T6 detected by the detecting part 58 is not only the surface temperature of the material, but can be the temperature inside the material if a needle-shaped sensor is employed. Accordingly, with the use of the above temperature detection means 52, the temperature T6 at an optional point of the material can be detected without connecting the material with the cooking apparatus main body via a wire. The same effect as discussed before is obtained when the temperature T4 inside the material is estimated based on the detected temperature T6 to thereby control the heating means 48.

Figure 17:
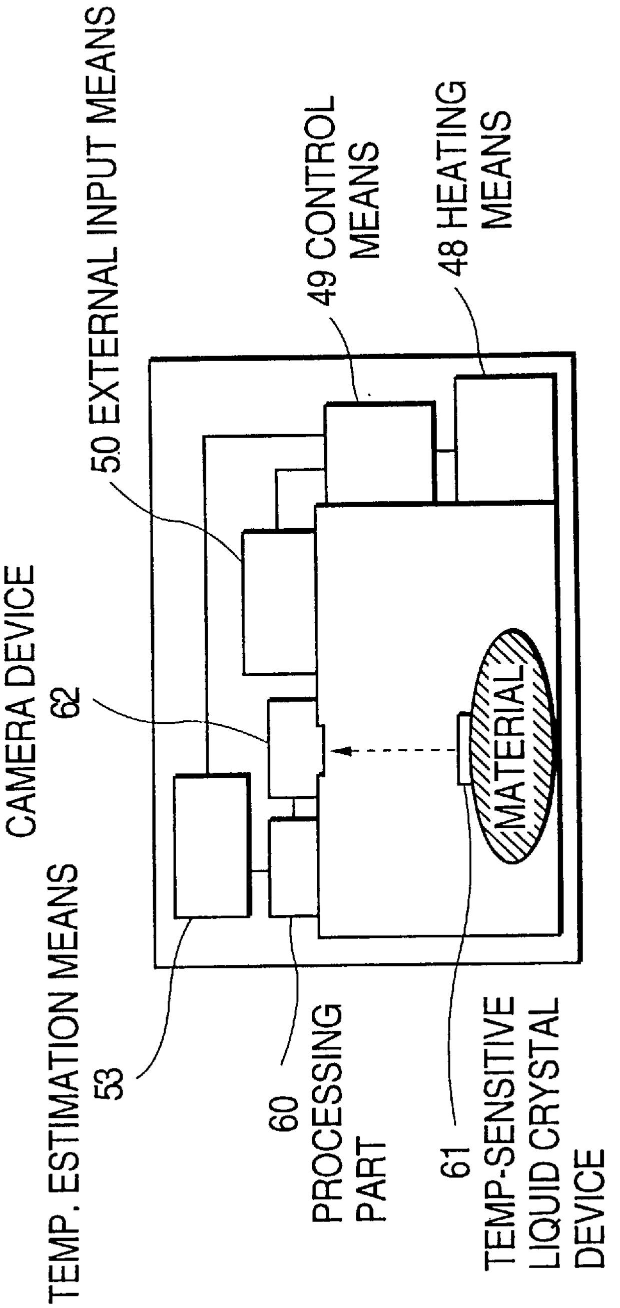
FIG. 17 is a schematic diagram showing an embodiment of the third cooking apparatus of the present invention.

FIG. 17 is an example of the apparatus in which a temperature-sensitive liquid crystal device 61 and a camera device 62 are used respectively as the detecting part and the receiving part of the temperature detection means. The temperature-sensitive liquid crystal has a characteristic of changing its color in accordance with temperatures. When the temperature-sensitive liquid crystal device 61 is attached in tight contact with the material to be cooked, the surface temperature can be displayed by color. A change of the color is detected by the camera device 62, which is converted to a temperature. The surface temperature of the material is accordingly obtained. The heating means is controlled by estimating the internal temperature based on the above-obtained surface temperature and in accordance with the set temperatures input beforehand through the external input means 50, achieving the same effect as in the foregoing examples.

Figure 18:
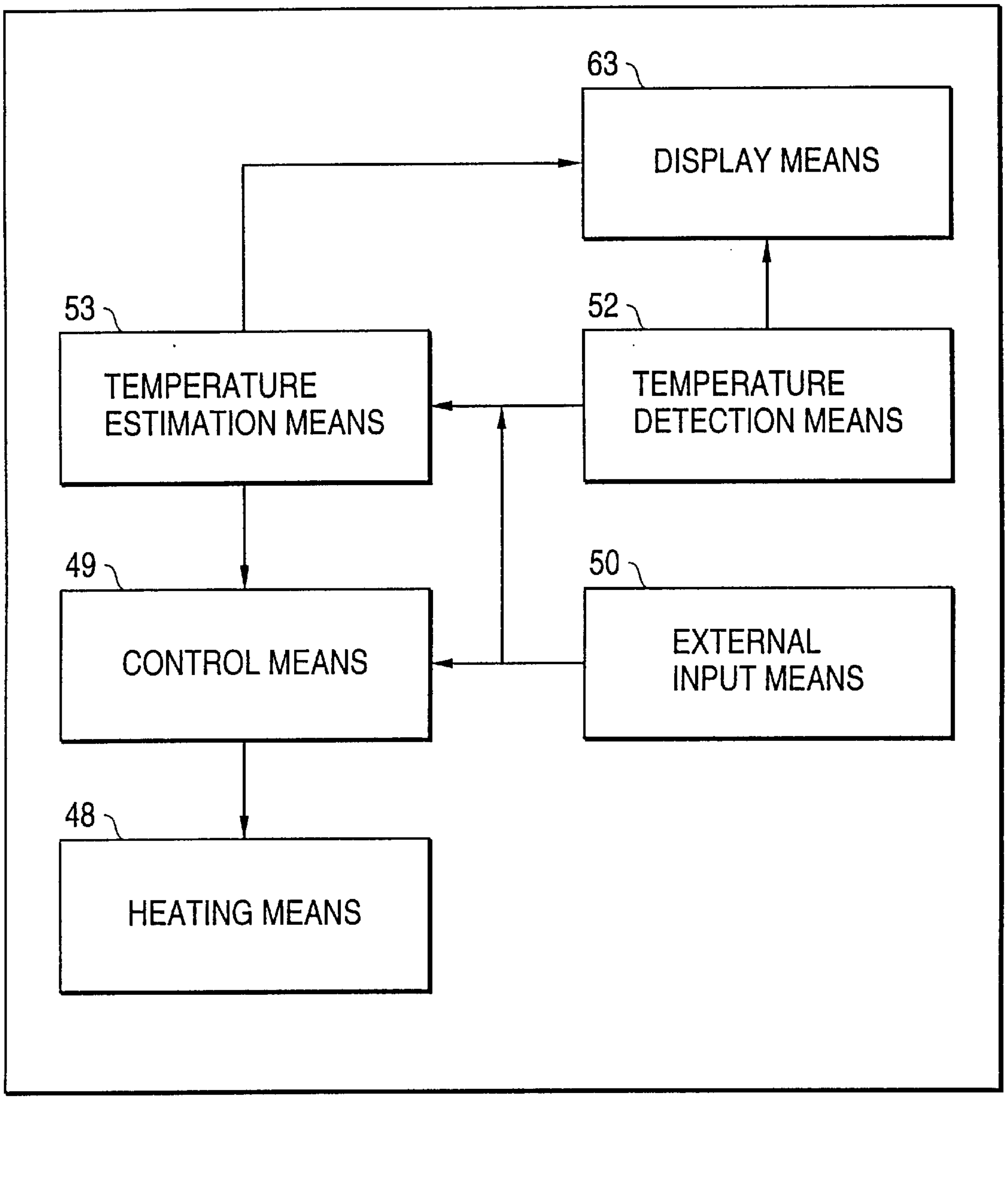
FIG. 18 is a block diagram schematically showing the cooking apparatus of the present invention equipped with a display means.

FIG. 18 is a block diagram showing the constitution of the apparatus provided with a temperature display means 63. The display means 63 displays at least one of the temperature detected by the temperature detection means 52, the temperature estimated by the temperature estimation means 53 and the set temperatures input through the external input means 50. The display is made digitally by numerical values, in analog form through the swing or rotation of an indicator, or graphically to show the temperature change with time visually, etc. Since the temperature is displayed every moment, the progress of heating is observed, that is, smooth progress of heating is confirmed, hence ensuring the user a sense of security. At the same time, the heating can be interrupted or heating intensity can be changed upon necessities. Not only the simple automatic heating, but finely sensitive control of heating is enabled if required, based on the set temperatures input through the external input means 50.

Figure 19:
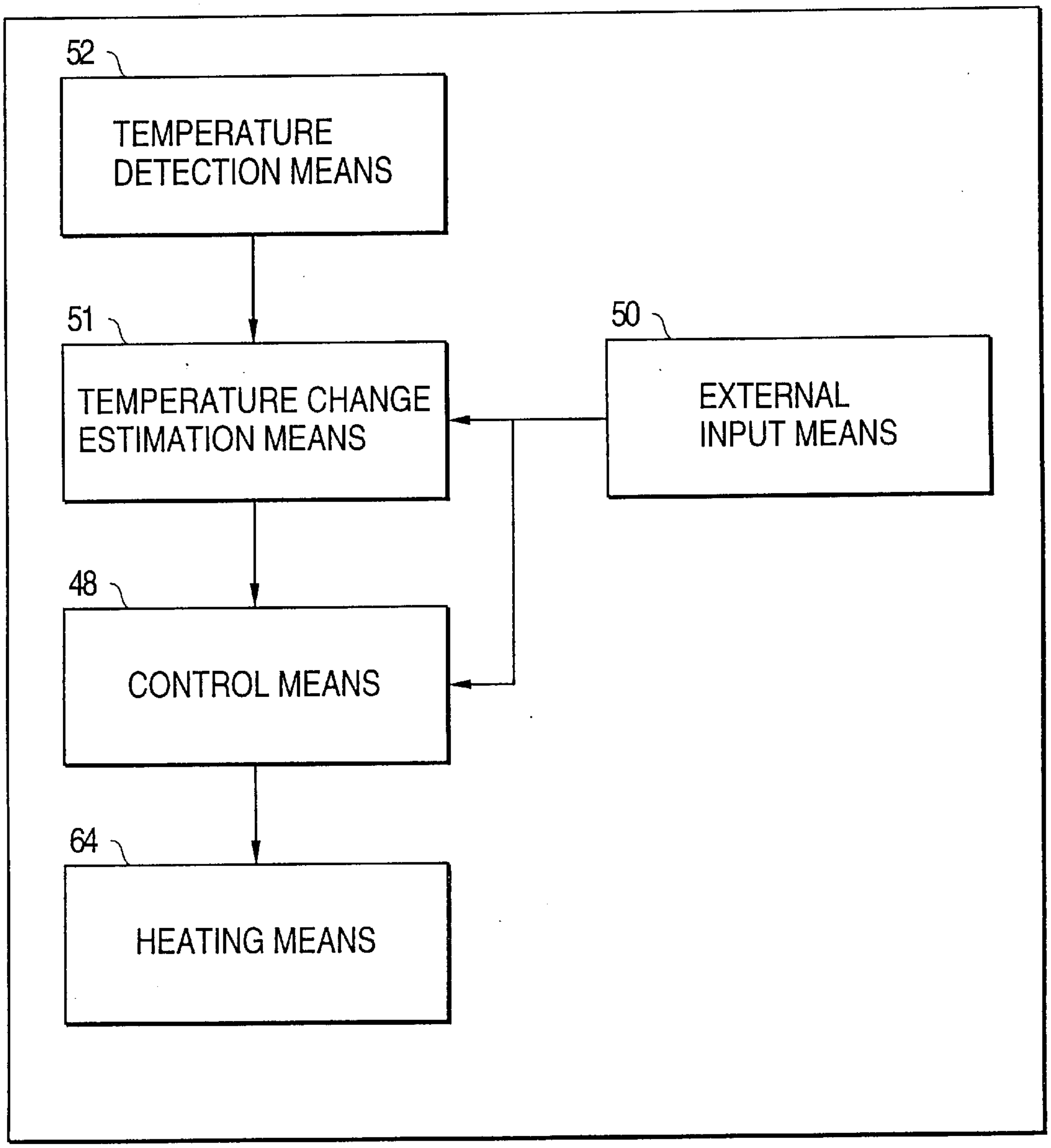
FIG. 19 is a block diagram schematically showing a fourth cooking apparatus of the present invention.

FIG. 19 is a block diagram of the constitution when a high frequency heating means 64 is used as the heating means. High frequency heating is a way of heating by a microwave oven, which is characterized in direct heating of the interior of the material by means of electric waves, unlike the heating by gas or electric heater whereby the interior of the cooking material is heated through the transmission and conduction of heat from the surface of the material. Therefore, the heating method does not require preheating and is widely applied to microwave ovens for heating of food. However, since the heating amount by high frequency waves is greatly difficult to control, the high frequency heating is not usually executed when required to be sensitively controlled.

According to the present invention, a temperature change estimation means 51 matched to the high frequency heating means 64 is installed. This estimation means 51 estimates the temperature change of the material subsequent to heating by high frequency waves, and controls the high frequency heating means 64 to agree with at least one of the set temperatures input from the external input means 50. The material is cooked at a required temperature while the convenience of the high frequency heating is maintained.

In the constitution of FIG. 19, the temperature change estimation means 51 may be replaced with the temperature estimation means 53, thereby to estimate the temperature of the material and to control the high frequency heating means 64 to agree with at least one of the set temperatures input through the external input means 50.

Figure 20:
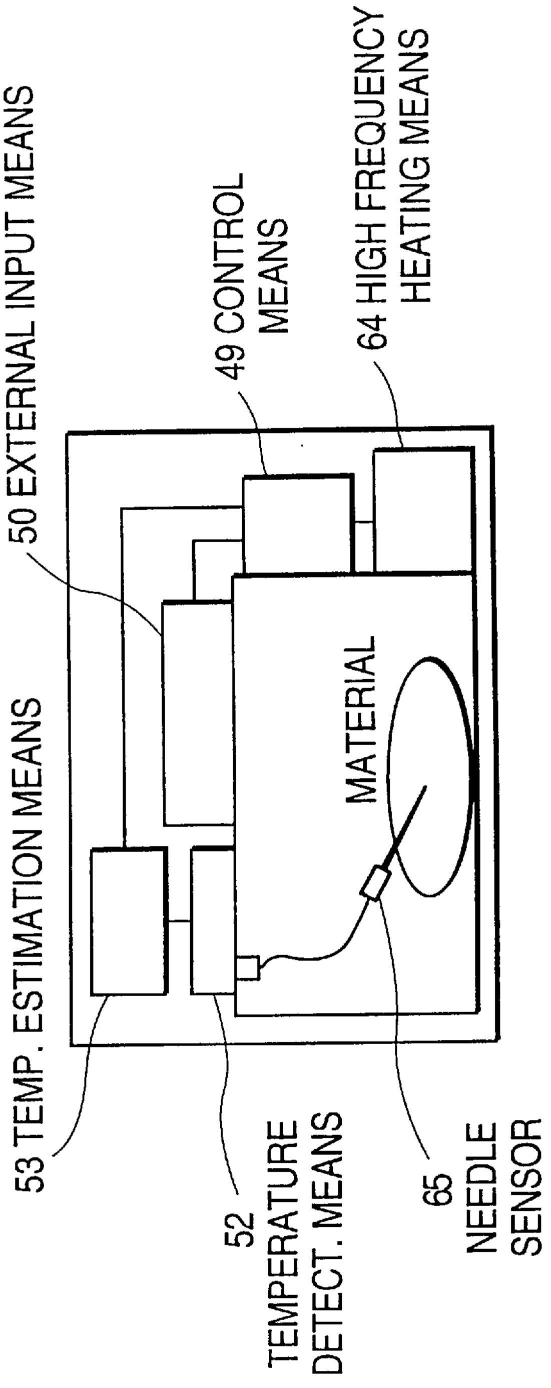
FIG. 20 is a schematic diagram showing an embodiment of the fourth cooking apparatus of the present invention.
Figure 21:
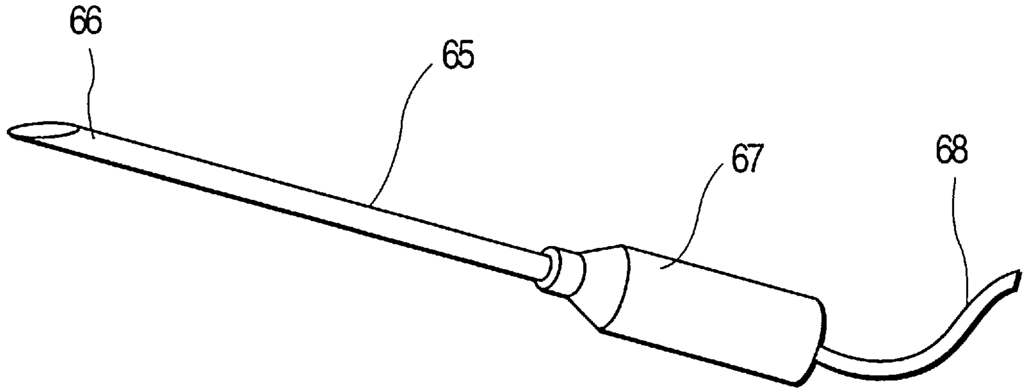
FIG. 21 is a perspective view of an appearance of a needle-shaped sensor used in the fourth cooking apparatus of the present invention.
Figure 22:
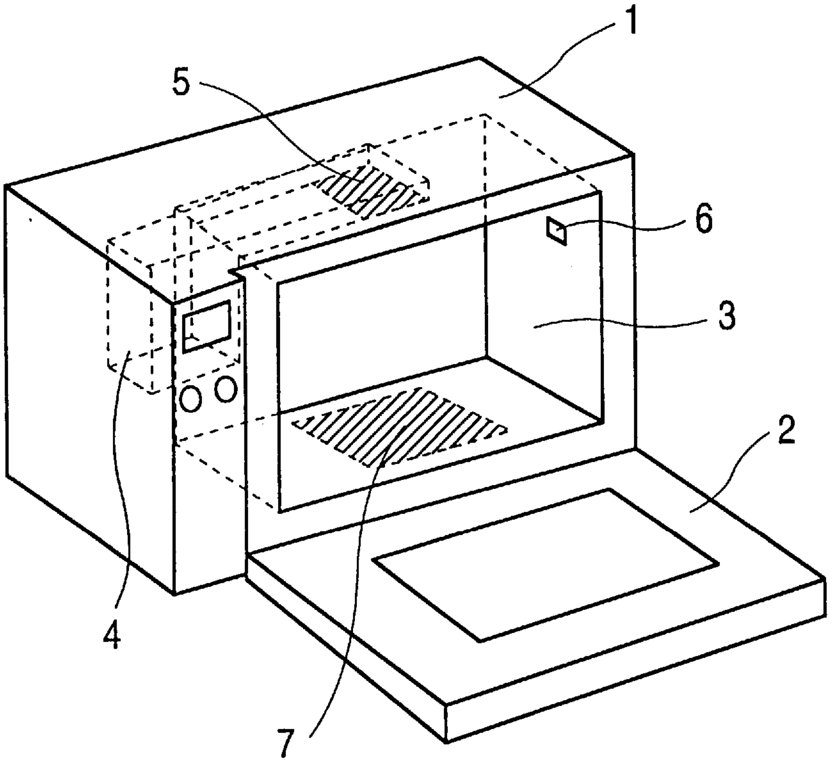
FIG. 22 (PRIOR ART)
FIG. 22 is a perspective view of a conventional high frequency cooking apparatus.

FIG. 20 indicates the constitution of the apparatus having the high frequency heating means 64 as the heating means and a needle-shaped sensor 65 as the temperature detection means. The needle-shaped sensor 65 is, as shown in FIG. 21, provided with a sensing part 66 at a front end of a needle of an outer diameter of approximately 1–2 mm. A shielded cable 68 extends from a handle part 67 supporting the needle, having the other end connected to a part inside the heating chamber to take out signals. Because of the shielded structure of the cable 68, the sensor can be used under high frequency heating waves. The sensing part 66 of the sensor is able to pierce the cooking material to thereby detect the internal temperature during cooking.

The temperature estimation means 53 estimates the temperature in the vicinity of the surface of the material based on an output of the high frequency heating means 64 and the temperature detected by the needle-shaped sensor 65. The temperature in the vicinity of the surface of the material is estimated by reason that the temperature rise of the material during high frequency heating is not uniform, and a part in the vicinity of the material surface becomes generally the highest temperature. While the needle-shaped sensor 65 can detect temperatures at any part of the material, when the sensing part 66 is sent into nearly the center of the material, the central temperature of the material, i.e., the lowest temperature of the material is detected. The highest temperature is then estimated from the detected lowest temperature. The temperature of the whole material can be controlled in this manner.

Specifically, a cooking process, e.g., when a chunk of meat is cooked to obtain roast beef will be discussed here. In general, meat should be uniformly heated at about 58° C. in order to not lose the flavor and for this purpose, the set temperature is designated in a manner described hereinbelow. First, the set temperature is designated so that the meat is cooked until the central part of the meat, hardest to transmit heat, reaches 58° C. In this case, although it is possible to designate the temperature change in the middle of cooking, the set temperature for a corner part of the meat should be handled with priority.

Secondly, the set temperature for the corner part of the meat, which is easiest to heat, is designated. This part of the meat is heated relatively quickly by any heating means, but shows a particularly quick temperature rise when a high frequency heating means is used. Therefore, the set temperature for the corner part should be designated so as not to exceed 58° C. when the meat is suddenly heated at the start of heating. The temperature is maintained at a constant value afterwards until the central part of the meat becomes 58° C.

The temperature at the central part is directly detected by the needle-shaped sensor 65, while the temperature of the corner part is estimated by the temperature estimation means 53 from the outputs of the heating means and the needle-shaped sensor 65. Since the temperature of the corner part is set not to exceed 58° C., the apparatus is controlled to stop heating if an estimated temperature value of the corner part becomes higher than 58° C. The temperature of the central part is raised while the temperature of the corner part is maintained constant by repeatedly turning the apparatus ON and OFF. Finally when the central part shows 58° C., the entire chunk of meat is in a state heated at about 58° C.

Although the foregoing explanation describes how to designate the set temperatures and the operation therefor when the material is to be wholly uniformly heated, a uniform heating area can be enlarged or reduced depending on the way of designation.

According to the temperature estimation method of the present invention as described above, the temperature of the material to be cooked which shows a temperature irregularity during heating can be detected at one or a plurality of points. More concretely, according to the first temperature estimation method of the invention, the temperature distribution inside the material is obtained by expressing the phenomenon that high frequency waves attenuate as they penetrate from the surface of the material where a reference point is set. Similarly, when the reference point is set at the center of the material, the temperature of the material is estimated with the heating irregularity due to the shape of the material. That is, the fact that an end part is easier to heat than the central part of the material is taken into consideration. The accuracy is enhanced when the reference point is set both at the surface of the material and at the central part of the material. According to the second temperature estimation method, the operation coefficient for obtaining the temperature change rate is prepared for each of two predetermined points of the material, whereby the temperature can be estimated at considerably high speeds. According to the third temperature estimation method, the central temperature is estimated in real time while the material is actually cooked. Since the temperature of the corner part on the surface of the material is detected by the temperature detection means, the central temperature can be estimated with high accuracy.

As depicted hereinabove, since the temperature change of the material being heated is detected in the present temperature estimation method, heating can be controlled in conformity with a required temperature change pattern. The optimum heating condition can be examined before the start of heating, and moreover, the heating intensity is adjustable during heating based on the detected central temperature of the material. Therefore, even when a cooking material not tried before is to be cooked, not only the optimum heating pattern can be set without requiring experiences, but the temperature can be controlled more easily than based on an indirect parameter such as steam or the like. Good cooking is hence achieved at all times.

The cooking apparatus according to the present invention is provided with the temperature change estimation means or, both the temperature detection means and the temperature estimation means, whereby the optimum control of heating is realized. In other words, the temperature change during heating can be estimated due to the function of the temperature change estimation means once the data of the material to be cooked and basic heating conditions are set. The heating condition is corrected so that the estimated result agrees with a required set temperature input beforehand. Even if one uses the apparatus for the first time, the optimum heating pattern is set independently of one's experience. Good cooking is ensured at all times.

Further, in the cooking apparatus of the present invention including the temperature detection means and the temperature estimation means, the temperature of the material (primarily the internal temperature) is estimated, and the change of the temperature is controlled to be a required set temperature. The optimum heating as required is accordingly carried out.

The temperature detection means is, for instance, a detection means for detecting the temperature of an atmosphere where the material is placed, a non-contact-type detection means or a contact-type detection means brought in touch with the material thereby to detect the surface temperature of the material, etc. The effect resulting from the estimation of the temperature of the material on the basis of the detected temperature is the same as discussed above.

In the constitution with the display means for displaying the temperature detected by the temperature detection means or the estimated temperature based on the above-obtained temperature, the temperature can be manually controlled more delicately with reference to the displayed temperature.

Moreover, although the temperature control has been conventionally difficult in the cooking apparatus using a high frequency heating means as the heating means, namely, in the microwave oven, and an amount of experience has been required to heat to a required temperature, the cooking apparatus of the present invention, equipped with the temperature change estimation means or temperature estimation means, makes it possible to set any required temperatures irrespective of experience.

Additionally, while the temperature inside the material, (at which location it is hard to heat the material), is detected by the temperature detection means, the temperature of the surface of the material, (at which location it is easy to heat the material by high frequency waves), is estimated by the temperature estimation means, so that the whole material can be controlled to be a required temperature.

As described hereinabove, since the temperature of the cooking material being heated is estimated by some way, anyone can quantitatively control heating/cooking, which has conventionally been dependent on experiences or performed intuitively.

INDUSTRIAL APPLICABILITY

According to the temperature estimation method of the present invention, the temperature of the material to be cooked, which shows temperature irregularities during heating, can be detected at one or a plurality of points, whereby the heating is controlled to make the temperature change of the material agree with a required temperature change. The invention is suitable to estimate the temperature inside the material or the temperature change when the material is cooked by way of radiation heating, conduction heating or high frequency heating, etc.

According to the cooking apparatus of the present invention, the temperature change of the material being heated can be estimated once data of the material and fundamental heating conditions are set, and therefore the optimum heating pattern is set without depending on one's experience or intuition. The cooking apparatus of the present invention is hence particularly fit for use as a microwave oven or an oven, etc.

We claim:

1. A method of estimating a temperature inside a material to be cooked, comprising:

(a) storing data of values of physical properties of materials and storing thermal conduction operation procedures;

(b) receiving data of the material to be cooked and heating data;

(c) calculating a heating output to one of a plurality of parts of the material based on a distance between said one of the plurality of parts of the material and a predetermined reference point;

(d) obtaining a temperature rise value per unit time of said one of the plurality of parts from the data of the material to be cooked, received in said receiving of data, and the heating output calculated in said calculating;

(e) repeating (c) and (d) for each of the plurality of parts of the material to obtain a distribution of temperature rise values of an entirety of the material; and (f) carrying out a thermal conduction operation with use of the distribution of the temperature rise values, obtained in said repeating, in accordance with the thermal conduction operation procedures stored in said storing.

2. The method according to claim 1, further comprising:

setting a plurality of reference points, including the predetermined reference point, on a surface of the material;

wherein said calculating of the heating output to said one of the plurality of parts of the material is performed based on a distance between each of the plurality of reference points and said one of the plurality of parts.

3. The method according to claim 1, wherein said calculating of a heating output to one of a plurality of parts of the material is based on a distance between said one of the plurality of parts of the material and a central reference point set approximately at a center of the material.

4. The method according to claim 1, further comprising:

setting a plurality of reference points, including the predetermined reference point, wherein at least one of the plurality of reference points is set on a surface of the material and at least one of the plurality of reference points is set at a center of the material;

wherein said calculating of the heating output to said one of the plurality of parts of the material is performed based on the distance between each of the plurality of reference points and said one of the plurality of parts.

5. A method of estimating a temperature inside a material to be cooked, comprising:

(a) storing an operation coefficient set for every material to be cooked and operation procedures;

(b) receiving data of the material to be cooked and heating data;

(c) determining the operation coefficient for the material to be cooked, from the operation coefficients in said storing, based on an initial temperature obtained from the data of the material, a weight of the material to be cooked obtained from the data of the material, and a heating output obtained from the heating data;

(d) calculating a temperature change rate at each of first and second parts of the material in accordance with the operation procedures with use of the operation coefficient for the material to be cooked determined in (c);

(e) setting an optional calculation time interval $\Delta T$;

(f) calculating a temperature of each of the first and second parts after the time interval $\Delta T$ based on the temperature change rate at each of the first and second parts;

(g) determining another operation coefficient for the material based on the temperatures of each of the first and second parts calculated in (f), the weight of the material obtained from the data of the material, and the heating output obtained from the heating data;

(h) recalculating the temperature change rate at each of the first and second parts in accordance with the operation procedures with use of the another operation coefficient determined in (g); and (i) repeating (f) through (h) so as to obtain temperatures of the first and second parts at an optional time point.

6. The method according to claim 5, wherein said determining of the operation coefficient of (c) is performed based on experimentally detected results.

7. The method according to claim 5, wherein said determining of the operation coefficient of (c) is performed based on thermal conduction analysis results by a computer.

8. A method of estimating a temperature inside a material to be cooked, comprising:

(a) storing an operation coefficient set for every material to be cooked and operation procedures;

(b) receiving data of the material and heating data;

(c) detecting a temperature on a surface of the material;

(d) determining the operation coefficient for the material to be cooked, from the operation coefficients in said storing, based on an initial temperature obtained from the data of the material, the temperature detected on the surface of the material, a weight of the material to be cooked obtained from the data of the material, and a heating output obtained from the heating data;

(e) calculating a temperature change rate at a predetermined part of the material in accordance with the operation procedures with use of the operation coefficient for the material to be cooked determined in said determining of (d);

(f) setting an optional calculation time interval $\Delta T$;

(g) calculating a temperature of the predetermined part of the material after the time interval $\Delta T$ based on the temperature change rates at the predetermined part of the material;

(h) determining another operation coefficient for the material based on the temperature of the predetermined part of the material calculated in (g), the temperature detected on the surface of the material, the weight of the material obtained from the data of the material, and the heating output obtained from the heating data;

(i) recalculating the temperature change rate at the predetermined part of the material in accordance with the operation procedures with use of the another operation coefficient determined in (h); and (j) repeating (g) through (i) so as to obtain a temperature of the predetermined part of the material at an optional time point.

9. A cooking apparatus comprising:

a heating means for heating a material to be cooked;

a control means for controlling said heating means;

an external input means; and a temperature change estimation means for estimating a temperature change of the material, wherein said external input means is operable for receiving a plurality of set temperatures corresponding to heating times for at least a part of the material being cooked, said temperature change estimation means is operable for estimating the temperature change of each part of the material subsequent to the control of said heating means, and said control means is operable for controlling said heating means so as to make the estimated temperature at any optional time point nearly agree with the plurality of set temperatures received by said external input means.

10. The cooking apparatus according to claim 9, wherein said heating means is a high frequency heating means.

11. A cooking apparatus comprising:

a heating means for heating a material to be cooked;

a control means for controlling said heating means;

an external input means for receiving a plurality of set temperatures corresponding to heating times for at least a part of the material being cooked;

a temperature estimation means for estimating a temperature of the material; and a temperature detection means for detecting a temperature of the material;

wherein said temperature estimation means is operable for estimating a temperature of a part of the material which is undetectable by said temperature detection means based on the temperature detected by said temperature detection means, and said control means is operable for controlling said heating means so as to make the temperature of the material nearly agree with the plurality of set temperatures received by said external input means.

12. The cooking apparatus according to claim 11, wherein said temperature detection means is operable for detecting an ambient temperature of an atmosphere surrounding the material, said temperature estimation means is operable for estimating the temperature inside the material based on the ambient temperature detected by said temperature detection means, and said control means is operable for controlling said heating means so as to make the estimated temperature inside the material nearly agree with the plurality of set temperatures received by said external input means.

13. The cooking apparatus according to claim 11, wherein said temperature detection means is operable for detecting a surface temperature of the material in a non-contact manner, said temperature estimation means is operable for estimating the temperature inside the material based on the surface temperature detected by said temperature detection means, and said control means is operable for controlling said heating means so as to make the estimated temperature inside the material nearly agree with the plurality of set temperatures received by said external input means.

14. The cooking apparatus according to claim 11, wherein said temperature detection means is operable to contact a surface of the material so as to detect a surface temperature of the material, said temperature estimation means is operable for estimating the temperature inside the material based on the surface temperature detected by said temperature detection means, and said control means is operable for controlling said heating means so as to make the temperature inside the material nearly agree with the plurality of set temperatures received by said external input means.

15. The cooking apparatus according to claim 11, further comprising a display means for displaying at least one of the temperature detected by said temperature detection means, the temperature estimated by said temperature estimation means, and the set temperatures input through said external input means.

16. The cooking apparatus according to claim 13, wherein said temperature detection means is an infrared temperature sensor.

17. The cooking apparatus according to claim 15, wherein said heating means is a high frequency heating means.

18. A cooking apparatus comprising:

a heating means for heating a material to be cooked;

a control means for controlling said heating means;

an external input means for receiving a plurality of set temperatures corresponding to heating times for at least a part of the material being cooked;

a temperature estimation means for estimating a temperature of the material; and a temperature detection means for detecting a temperature of the material comprising a detecting part to be fitted at a surface of the material, a receiving part for receiving data from said detecting part in a non-contact manner, and a processing part for converting received data to temperatures;

wherein said temperature detection means is operable for detecting a temperature of the surface of the material or a part inside the material, said temperature estimation means is operable for estimating a temperature inside the material based on the temperature detected by said temperature detection means, and said control means is operable for controlling said heating means so as to make the estimated temperature inside the material nearly agree with the plurality of set temperatures input through said external input means.

19. The cooking apparatus according to claim 18, wherein said detecting part is a temperature-sensitive liquid crystal device and said receiving part is a camera device.

20. The cooking apparatus according to claim 18, further comprising a display means for displaying at least one of the temperature detected by said temperature detection means, the temperature estimated by said temperature estimation means, and the set temperatures input through said external input means.

21. The cooking apparatus according to claim 18, wherein said heating means is a high frequency heating means.

22. A cooking apparatus comprising:

a high frequency heating means for heating a material to be cooked;

a control means for controlling said high frequency heating means;

an external input means for receiving a plurality of set temperatures corresponding to heating times for at least a part of the material being cooked;

a temperature estimation means for estimating a temperature of the material; and a needle-shaped temperature detection means for being inserted into the material and for detecting a temperature inside the material;

wherein said temperature estimation means is operable for estimating a temperature of said part of the material based on the temperature inside the material detected by said needle-shaped temperature detection means, and said control means is operable for controlling said heating means so as to make the estimated temperature of said part of the material nearly agree with the plurality of set temperatures received by said external input means.

* * * * *